United States Patent
Kmita et al.

(10) Patent No.: US 9,381,865 B2
(45) Date of Patent: Jul. 5, 2016

(54) CARGO MANAGEMENT SYSTEM FOR USE WITH MOTOR VEHICLES

(71) Applicant: JAC Products, Inc., Saline, MI (US)

(72) Inventors: Gerard J. Kmita, Allen Park, MI (US); Jeffrey M. Aftanas, Ortonville, MI (US)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 14/571,659

(22) Filed: Dec. 16, 2014

(65) Prior Publication Data

US 2015/0175080 A1  Jun. 25, 2015

Related U.S. Application Data

(60) Provisional application No. 61/919,330, filed on Dec. 20, 2013.

(51) Int. Cl.
*B60R 7/02* (2006.01)
*B60R 5/04* (2006.01)

(52) U.S. Cl.
CPC .... *B60R 7/02* (2013.01); *B60R 5/04* (2013.01)

(58) Field of Classification Search
CPC .................................. B60R 5/04; B60R 7/02
USPC ............................................. 296/37.5, 37.16
See application file for complete search history.

(56) References Cited

U.S. PATENT DOCUMENTS

| | | |
|---|---|---|
| 4,226,348 A | 10/1980 | Dottor et al. |
| 4,718,584 A | 1/1988 | Schoeny |
| 5,392,972 A | 2/1995 | Caruso et al. |
| 5,713,502 A | 2/1998 | Dixon |
| 6,015,071 A | 1/2000 | Adomeit et al. |
| 6,296,289 B1 | 10/2001 | Gehring et al. |
| 6,488,168 B1 * | 12/2002 | Wang ........................ B60R 7/02 220/6 |
| 6,609,744 B2 | 8/2003 | Gehring et al. |
| 7,201,421 B2 | 4/2007 | Reynolds et al. |
| 8,215,693 B2 | 7/2012 | Ulita |
| 2002/0000456 A1 | 1/2002 | Zimmermann et al. |

FOREIGN PATENT DOCUMENTS

| | | |
|---|---|---|
| DE | 4015556 A1 | 11/1990 |
| DE | 4234812 A1 | 4/1994 |
| DE | 4432369 A1 | 3/1996 |
| DE | 10110335 A1 | 9/2002 |
| DE | 102006052785 A1 | 5/2008 |
| DE | 102008061108 A1 | 6/2010 |
| EP | 1321335 A1 | 6/2003 |
| FR | 2752790 A1 | 3/1998 |
| GB | 2466202 A | 6/2010 |
| JP | 2003025922 A | 1/2003 |

* cited by examiner

*Primary Examiner* — Pinel Romain
(74) *Attorney, Agent, or Firm* — Harness, Dickey & Pierce, P.L.C.

(57) ABSTRACT

The present disclosure relates to a cargo management system for use in a cargo area of a motor vehicle. The system may have a floor pan configured to be fixedly secured to a surface of the cargo area and a back wall. The back wall may be pivotally secured to the floor pan adjacent an edge of the floor pan. At least first and second divider wall panels may be provided which are each pivotally secured to the back wall and spaced apart from one another. Each may be moveable between a collapsed orientation, wherein the plurality of divider wall panels rest parallel and closely adjacent a surface of the floor pan, and an upright orientation wherein each of the divider wall panels, along with the back wall, form at least one compartment for containing cargo items therein.

20 Claims, 23 Drawing Sheets

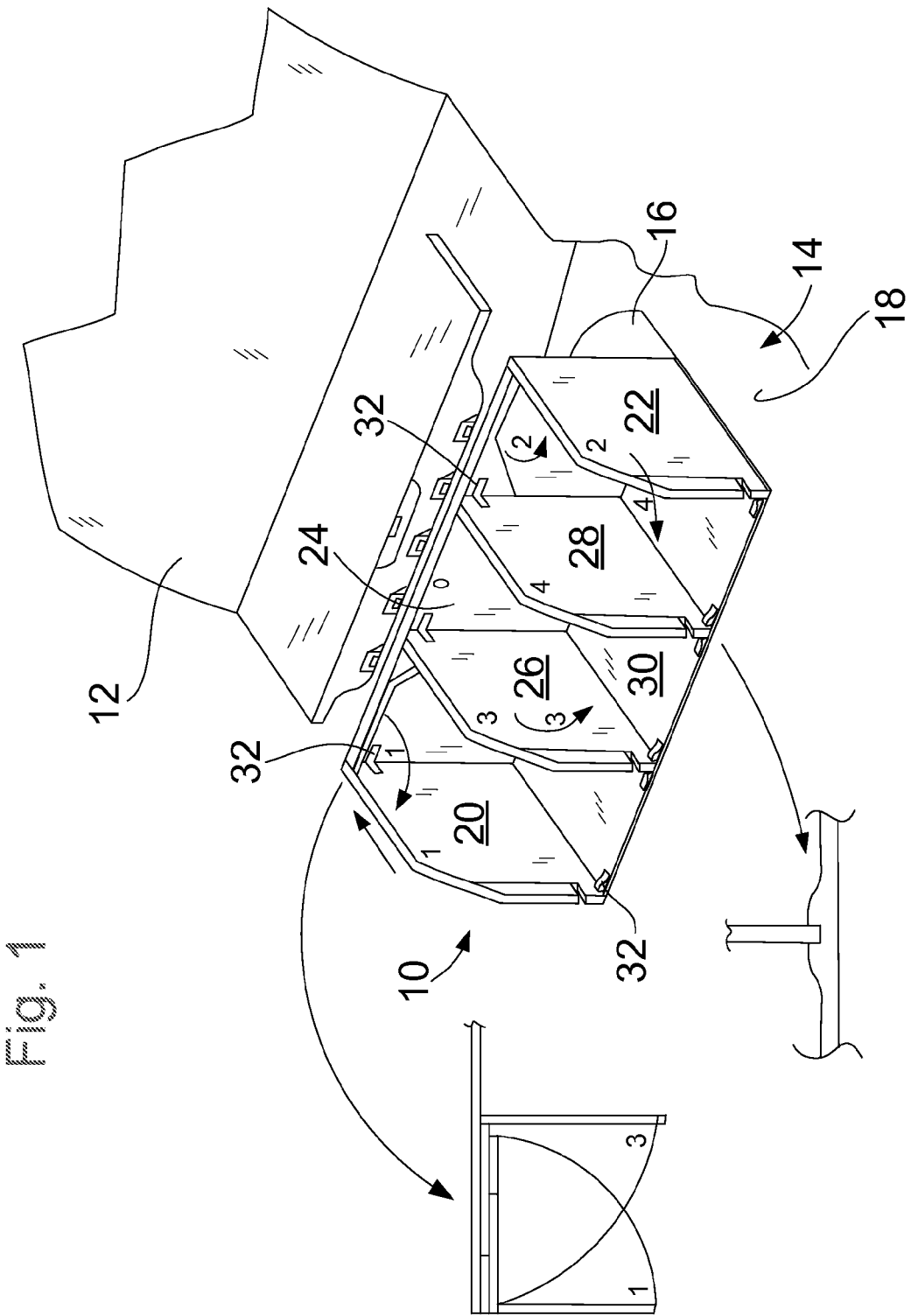

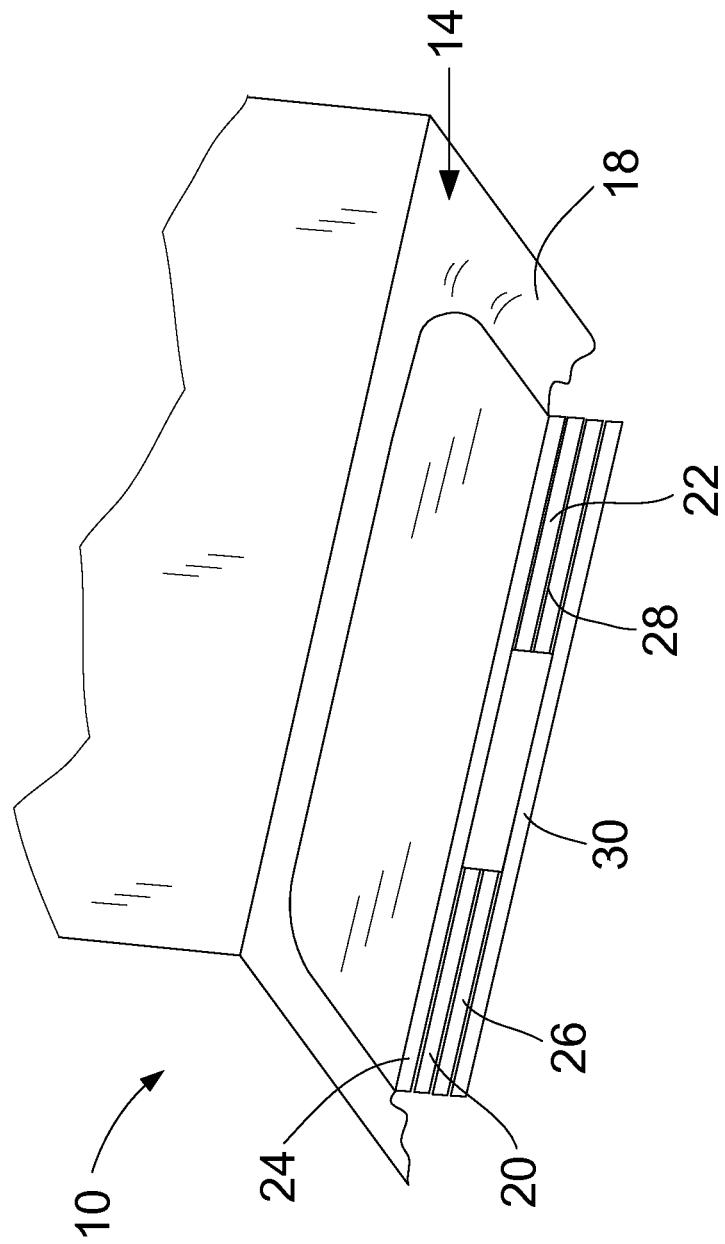

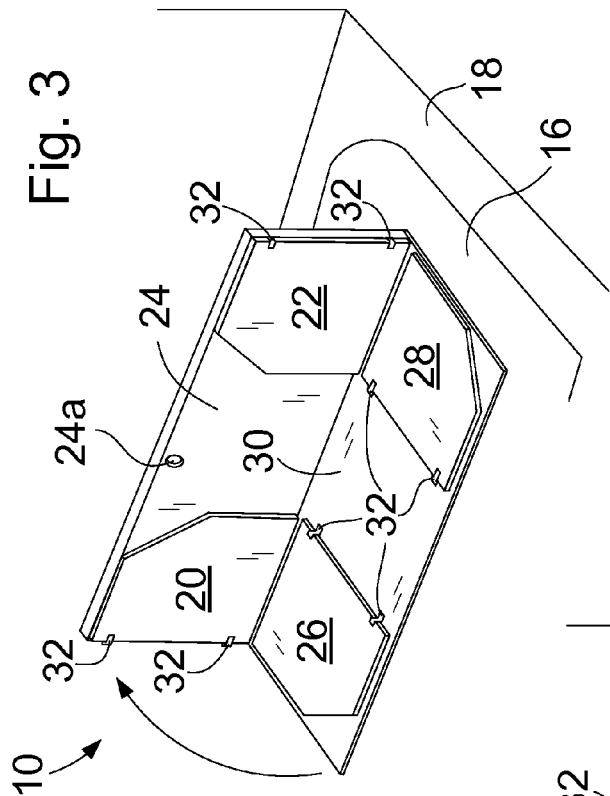
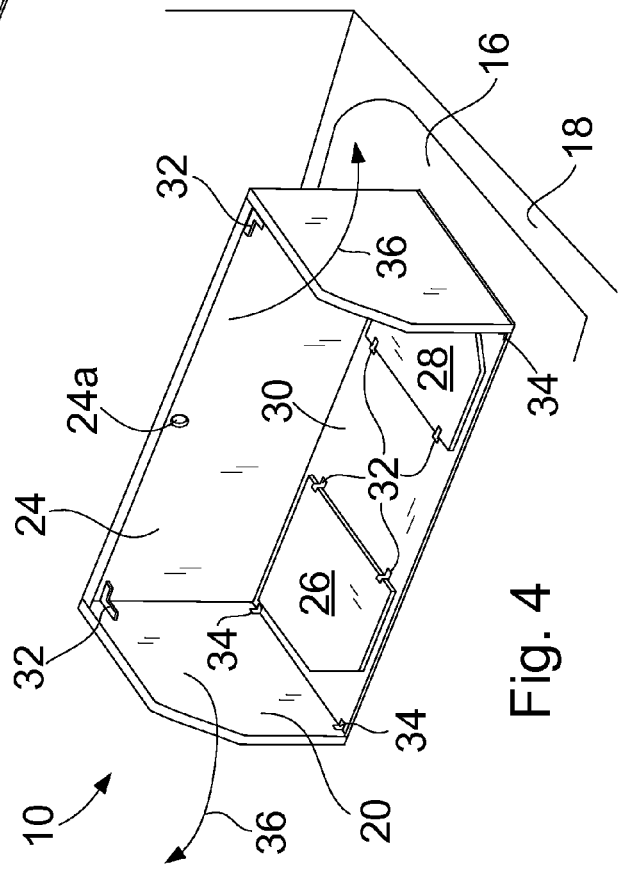

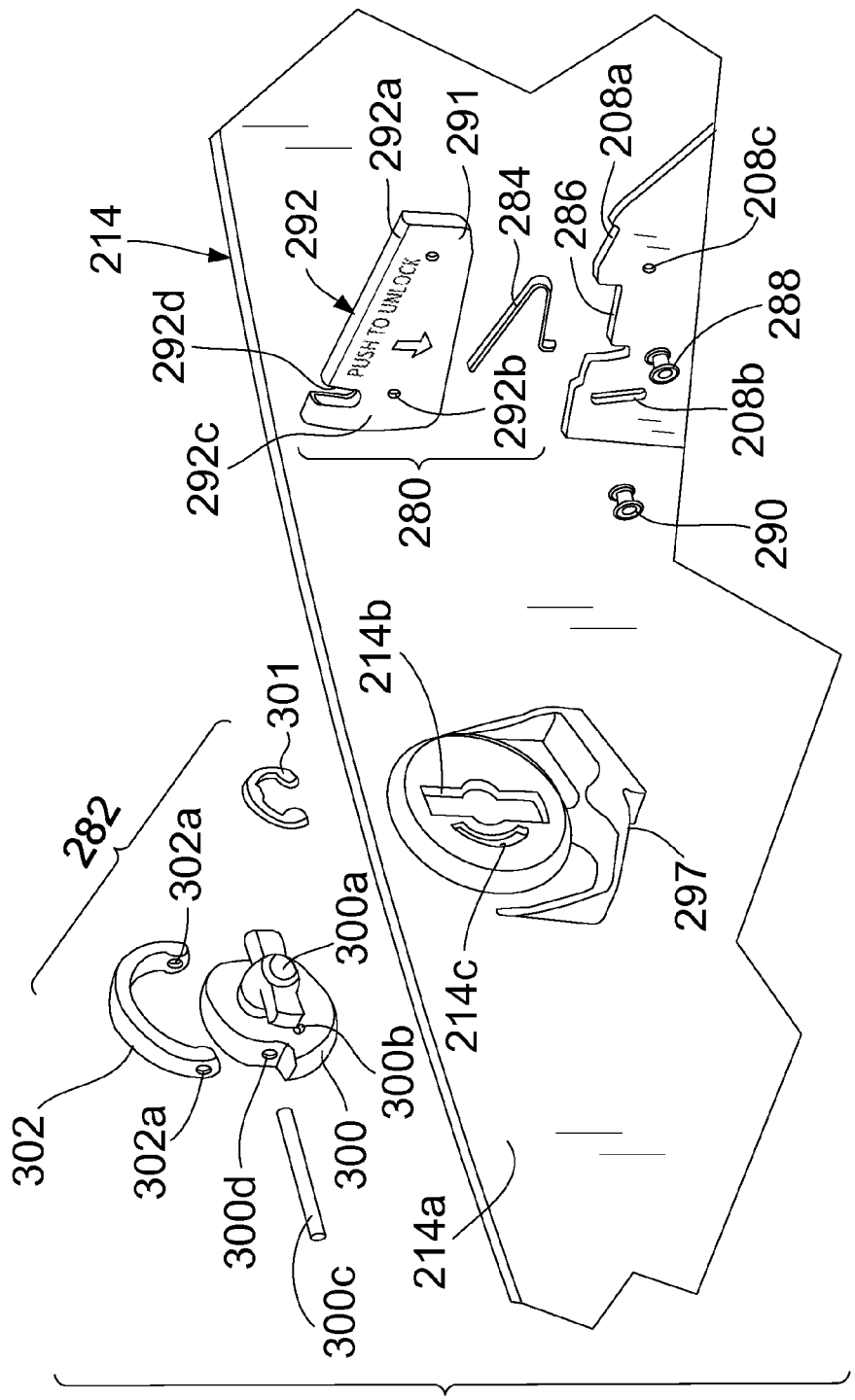

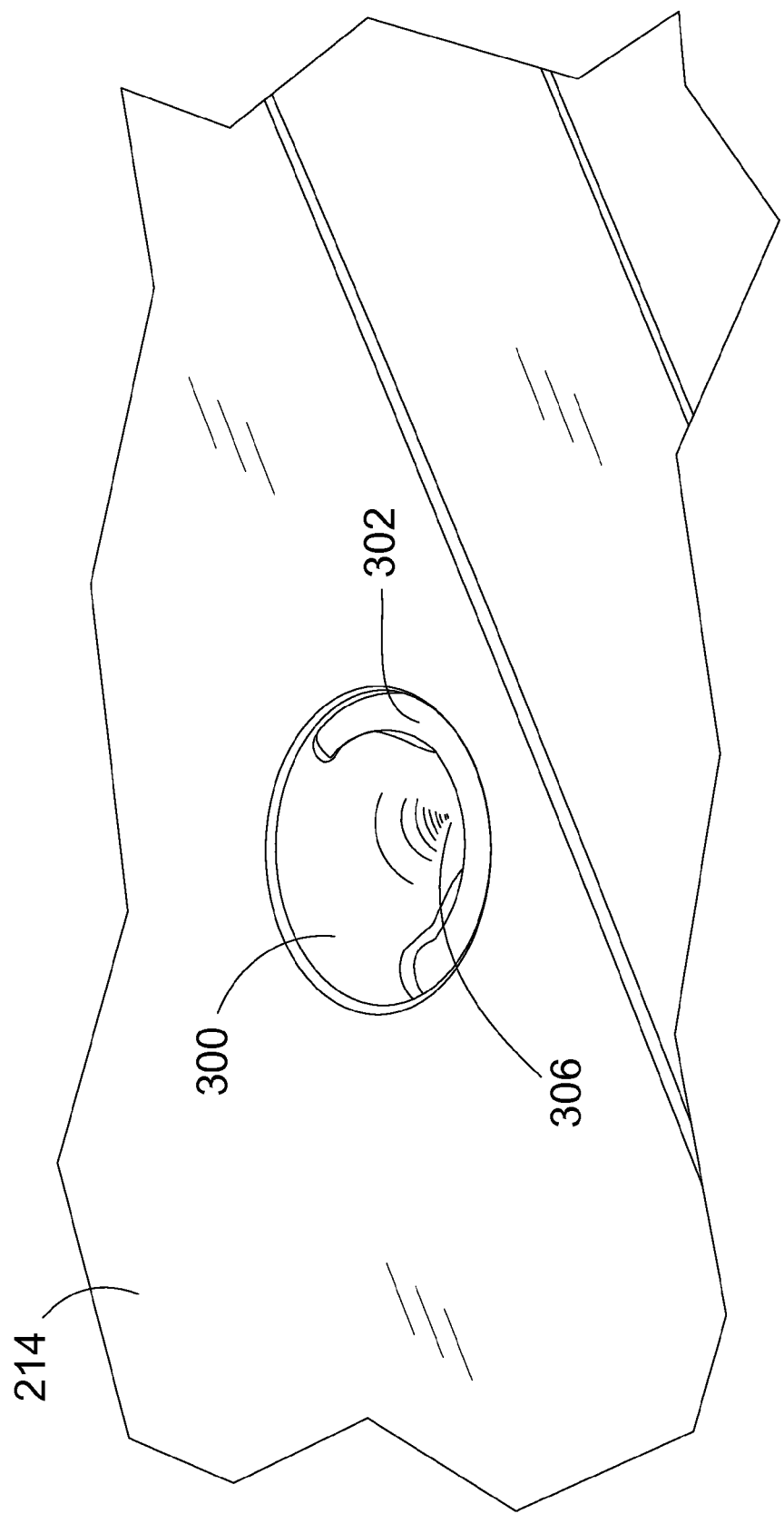

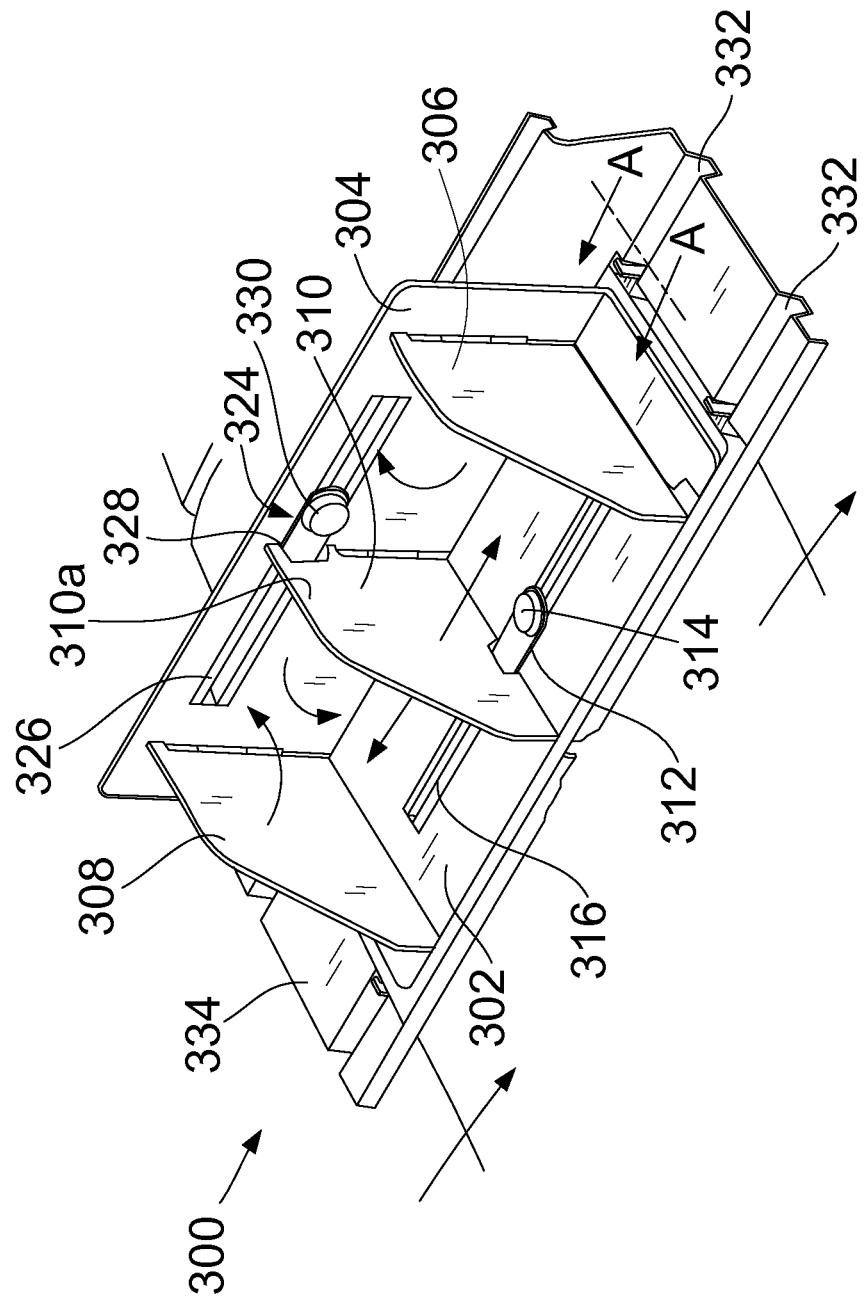

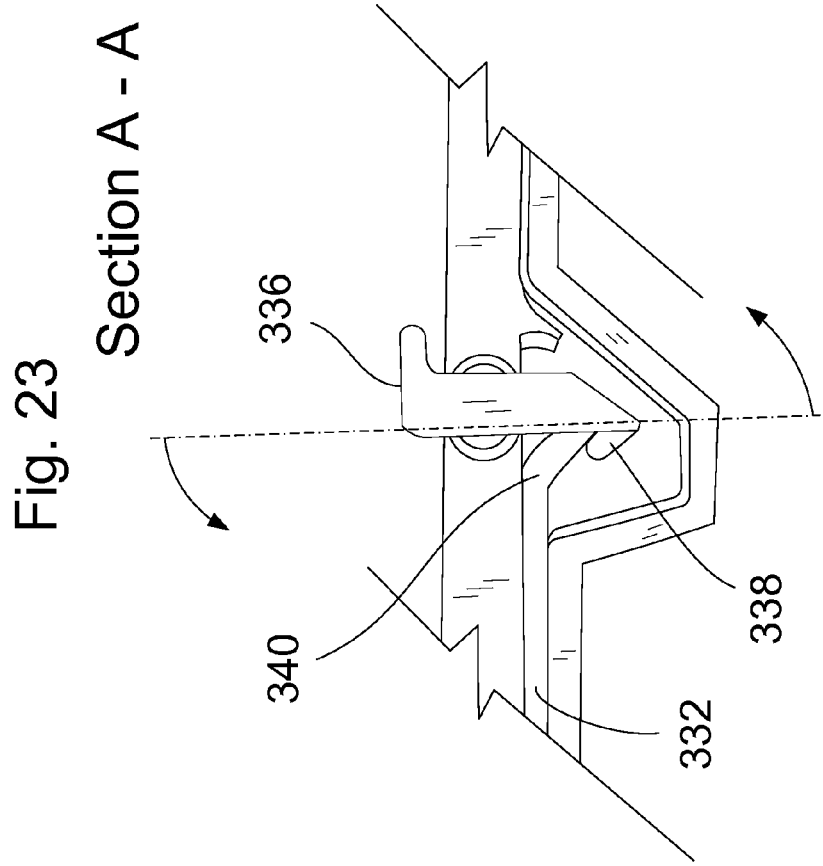
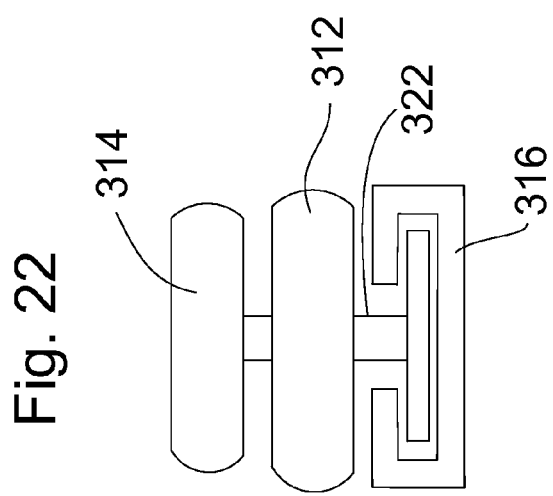

CARGO MANAGEMENT SYSTEM FOR USE WITH MOTOR VEHICLES

CROSS REFERENCE TO RELATED APPLICATIONS

The present application claims priority from U.S. provisional patent application Ser. No. 61/919,330, filed Dec. 20, 2013, the entire disclosure of which is hereby incorporated by reference into the present disclosure.

FIELD

The present disclosure relates to stowage system used with motor vehicles, and particularly to a collapsible stowage system configured to be used in a trunk of a motor vehicle such that it is substantially or entirely hidden from view when stowed, and able to be opened into a configuration where a plurality of wall components extend to form compartments for restraining cargo in the trunk.

BACKGROUND

The statements in this section merely provide background information related to the present disclosure and may not constitute prior art.

With motor vehicles such as sedans, station wagons and sport utility vehicles, when one needs to carry items such as groceries and other relatively some individual or bagged articles, such items are typically placed in the trunk area of the vehicle. However, as the vehicle travels, it is common for packages to tip over and the contents to be spilled out and then be free to roll or slide around in the trunk area. This is inconvenient both while driving, as the driver may hear items sliding in the trunk and hitting the interior walls of the trunk, and when the items need to be re-bagged before removing them from the trunk. However, it is generally undesirable to put permanent partitions in the trunk because that may reduce the utility of the trunk in being able to accommodate larger items. Accordingly, some form of restraining system is needed that is able to be easily stowed in the trunk when not needed, and yet placed quickly and easily in an operative configuration when the need arises to restrain smaller items or bags of items from tipping over and rolling or sliding around in the trunk.

SUMMARY

In one aspect the present disclosure relates to a cargo management system for use in a cargo area of a motor vehicle. The system may comprise a floor pan configured to be fixedly secured to a surface of the cargo area and a back wall. The back wall may be pivotally secured to the floor pan adjacent an edge of the floor pan. At least first and second divider wall panels may be included which are each pivotally secured to the back wall and spaced apart from one another. Each of the first and second divider wall panels are moveable between a collapsed orientation, wherein the plurality of divider wall panels rest parallel and closely adjacent a surface of the floor pan, and an upright orientation wherein each of the divider wall panels, along with the back wall, form at least one compartment for containing cargo items therein.

In another aspect the present disclosure relates to a cargo management system for use in a cargo area of a motor vehicle. The system may comprise a floor pan configured to be fixedly secured to a surface of the cargo area, a back wall, first and second outer divider walls, and a center divider wall. The back wall is pivotally secured to the floor pan adjacent an edge of the floor pan. The first and second outer divider wall panels are each pivotally secured to the back wall and spaced apart from one another. Each of the first and second divider wall panels is moveable between a collapsed orientation, wherein the plurality of divider wall panels rest parallel and closely adjacent a surface of the floor pan, and an upright orientation. The center divider wall panel is pivotally secured to the floor pan at a location between the first and second outer divider wall panels. Each of the outer divider wall panels, along with the back wall and the center divider wall panel, form a plurality of adjacent compartments for containing cargo items therein.

In still another aspect the present disclosure relates to a cargo management system for use in a cargo area of a motor vehicle. The system may comprise a floor pan configured to be fixedly secured to a surface of the cargo area, a back wall, first and second outer divider walls, and a center divider wall panel. The back wall is pivotally secured to the floor pan adjacent an edge of the floor pan. The first and second outer divider wall panels are each pivotally secured to the back wall and spaced apart from one another. Each of the first and second divider wall panels is moveable between a collapsed orientation, wherein the plurality of divider wall panels rest parallel and closely adjacent a surface of the floor pan, and an upright orientation. Biasing components are associated with each of the first and second outer divider wall panels for tending to bias the first and second outer divider wall panels into open positions generally perpendicular to the back wall. The center divider wall panel is pivotally secured to the floor pan at a location between the first and second outer divider wall panels. Separate first latching systems are each associated with a separate one of the outer divider panels for securing the outer divider panels in upright positions generally perpendicular to back wall. A second latching mechanism is associated with the center divider wall panel. A locking mechanism is associated with the back wall that cooperates with the second latching mechanism to hold the center divider wall panel in an upright orientation generally perpendicular to the back wall when the center divider wall panel is deployed for use. Each of the outer divider wall panels, the center divider wall panel and the back wall, cooperatively form a plurality of adjacent compartments for containing cargo items therein.

BRIEF DESCRIPTION OF THE DRAWINGS

The drawings described herein are for illustration purposes only and are not intended to limit the scope of the present disclosure in any way.

FIG. 1 is a cutaway view of a trunk of a vehicle illustrating a cargo restraining system, in accordance with one embodiment of the present disclosure, in its operative configuration;

FIG. 2 is a high level perspective view of the system of FIG. 1 in its fully stowed orientation;

FIG. 3 is a perspective view of the system of FIG. 1 with the rear wall component lifted up and the remaining panels in their stowed positions;

FIG. 4 is a perspective view of the system of FIG. 1 with the outer panels folded out into their operative positions and releasably attached to the rear wall component;

FIG. 18a is an enlarged perspective, exploded view of the various components of both the locking system present on the back wall, and the latching mechanism used along the upper edge of the center divider wall panel;

FIG. 19 a view of an outer surface of the back wall of the cargo management system illustrating the knob used with the locking mechanism for locking and unlocking the back wall from the floor pan;

FIG. 21 is a perspective view of another embodiment of a cargo management system in accordance with the present disclosure, where the cargo management system is readily removable as a single unit from tracks formed in a floor of a cargo area of the vehicle;

FIG. 22 is a simplified side view of the lower base assembly of the system shown in FIG. 21; and FIG. 23 is a cross sectional view taken in accordance with section line A-A in FIG. 21 showing one of the latches of the cargo management system that may be used to retain the cargo management system within a recessed track in a floor of the vehicle.

DETAILED DESCRIPTION

Figure 5:
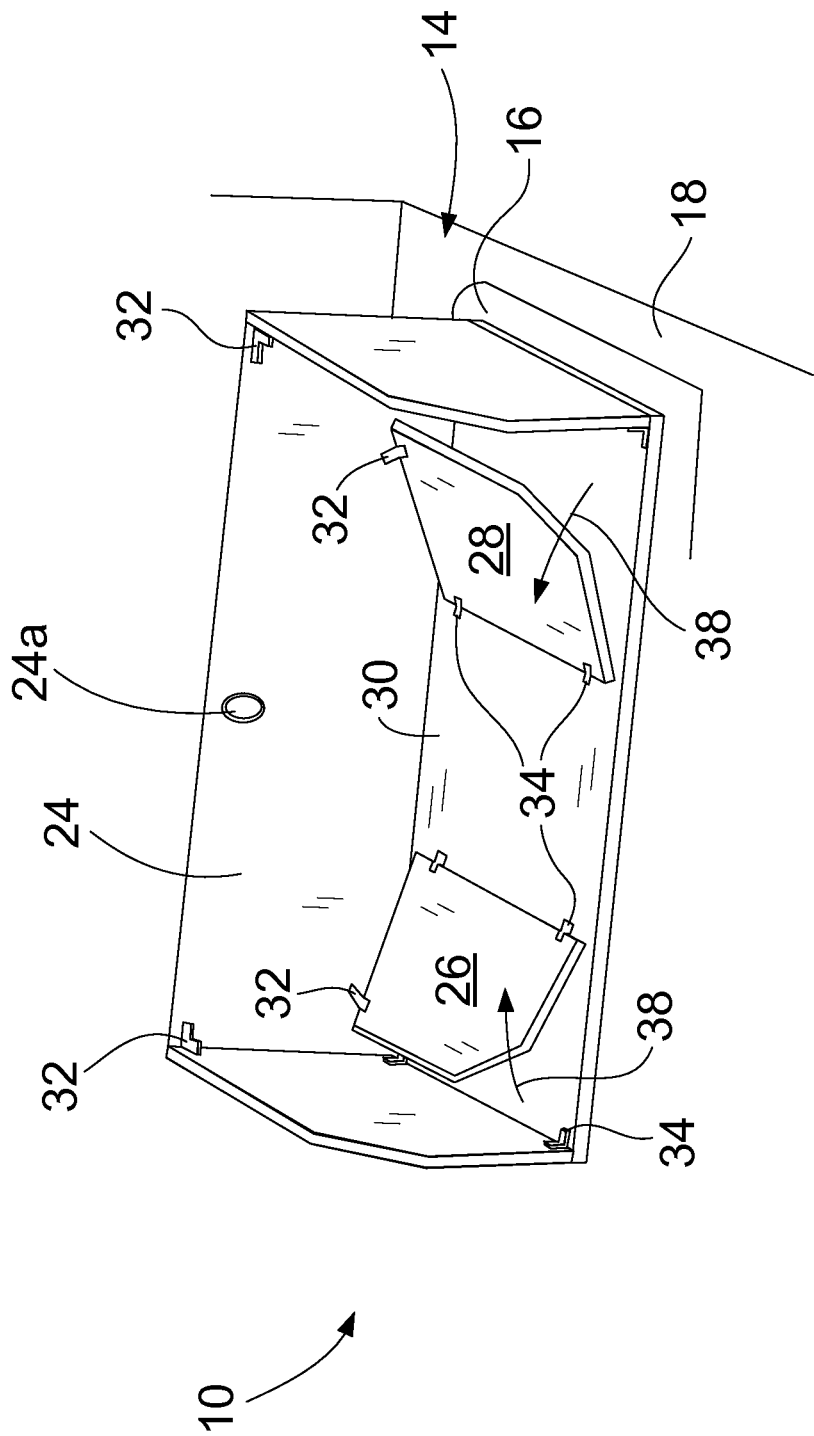
FIG. 5 is a perspective view of the system with the intermediate panels in the process of being opened to their operative positions.

The following description is merely exemplary in nature and is not intended to limit the present disclosure, application, or uses. It should be understood that throughout the drawings, corresponding reference numerals indicate like or corresponding parts and features.

Referring to FIG. 1, there is shown a cargo restraining system 10 in accordance with one embodiment of the present disclosure. The system 10 may be used in a trunk 14 of a vehicle 12 such as a sedan, sport utility vehicle (SUV), station wagon, crossover, minivan, commercial van, or even potentially in the bed of a pickup truck. However, the following discussion will be with reference to implementation of the system 10 in the trunk of a sedan, with it being understood that this specific implementation is only one example, and the system 10 may be used in a wide variety of vehicles.

The system 10 be built in to a recessed portion 16 of a floor 18 of the trunk 14. The system 10 may include outer panels 20 and 22 which are pivotally secured to a rear wall component 24. Intermediate wall panels 26 and 28 are pivotally secured to a bottom wall 30. Strips of hook and loop fasteners 32 may be used to hold the panels 20, 22, 26 and 28 in their operative positions. Fabric strips 34 may be used to form the hinges for the panels 20, 22, 26, 28 and the rear wall component 24, or any other type of lightweight hinge structure may be employed.

FIG. 2 illustrates the system 10 in its fully collapsed configuration within the recessed portion 16 of the trunk floor 18. The various panels 20, 22, 26, 28 and the rear wall component 24 all fold down in a highly compact configuration. When in the fully collapsed configuration, other larger cargo items can be rested on top of the rear wall component 24 and the entire trunk volume may be used for carrying larger cargo items.

FIG. 3 shows the system 10 in a partially opened condition. The rear wall compartment 24 has been lifted up. A small opening 24a may be provided to better facilitate opening of the rear compartment wall 24.

FIG. 4 shows the outer panels 20 and 22 folded out in the directions of arrows 36. Hook and loop fastening strips 32 are used to secure the panels 20 and 22 in their operative positions.

FIG. 5 shows the intermediate panels 26 and 28 being folded upwardly into their operative positions in accordance with arrows 38. The fully opened system 10 is shown in FIG. 1.

Referring to FIGS. 6-9, a cargo restraining system 100 (hereinafter simply "system 100") is shown in accordance with another embodiment of the present disclosure. The system 100 is somewhat similar to the system 10 and may be used to cover the recessed portion of a conventional trunk area of a passenger vehicle where the spare tire is stowed.

Figure 6:
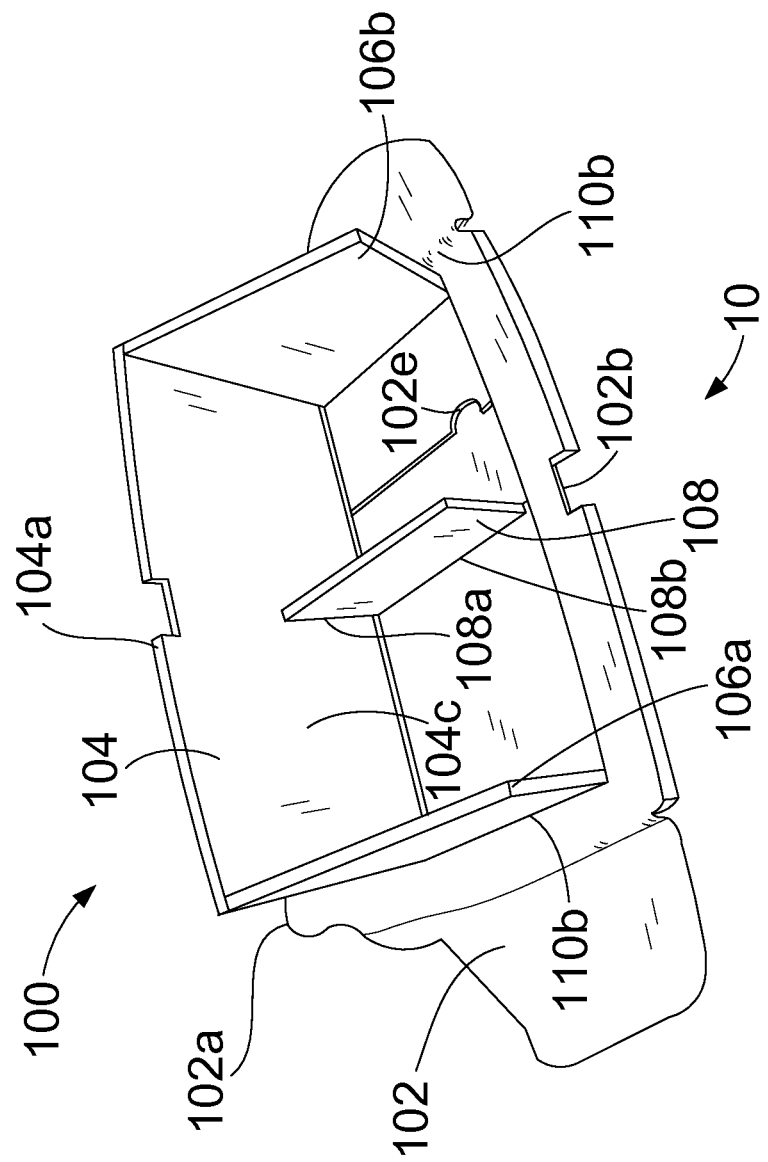
FIG. 6 is a perspective view of another embodiment of a cargo restraining system in accordance with the present disclosure, with the system removed from a vehicle trunk.

In FIG. 6 the system 100 is shown fully opened (i.e., fully deployed). The system 100 has been shown removed from the trunk area of a vehicle to better help illustrate its various components and operation. The system 100 may include a floor panel 102, a hingedly connected rear wall panel 104, a pair of hingedly connected side wall panels 106a and 106b, and a hingedly connected center divider panel 108. The floor panel 102 is shaped and of dimensions to fully cover the spare tire well where the spare tire of the vehicle is stored. Preferably, a rear edge 102a of the floor panel 102 is hingedly coupled to structure associated with the floor of the trunk so that the entire system 100 may be lifted with a single hand by grasping a cutout section 102b in the floor panel 102 and lifting the floor panel 102 upwardly. The floor panel 102, side wall panels 106a,106b and center divider panel 108 may each be made from a suitably thick section of plastic or otherwise strong but lightweight material, and may be covered with carpeting that matches the carpeting used in the vehicle trunk area. As such, the system 100 appears as an integral portion of the vehicle's trunk.

When the system 100 is in its fully opened position as shown in FIG. 6, the system is able to retrain articles from shifting in the trunk as the vehicle is moving. The system 100 is expected to find particular utility in restraining items such as bags of groceries in an upright orientation, as well as items that would ordinarily be prone to rolling around (for example produce such as cantaloupe, watermelon, etc.) in a conventional trunk with no article restraining system.

Figure 7:
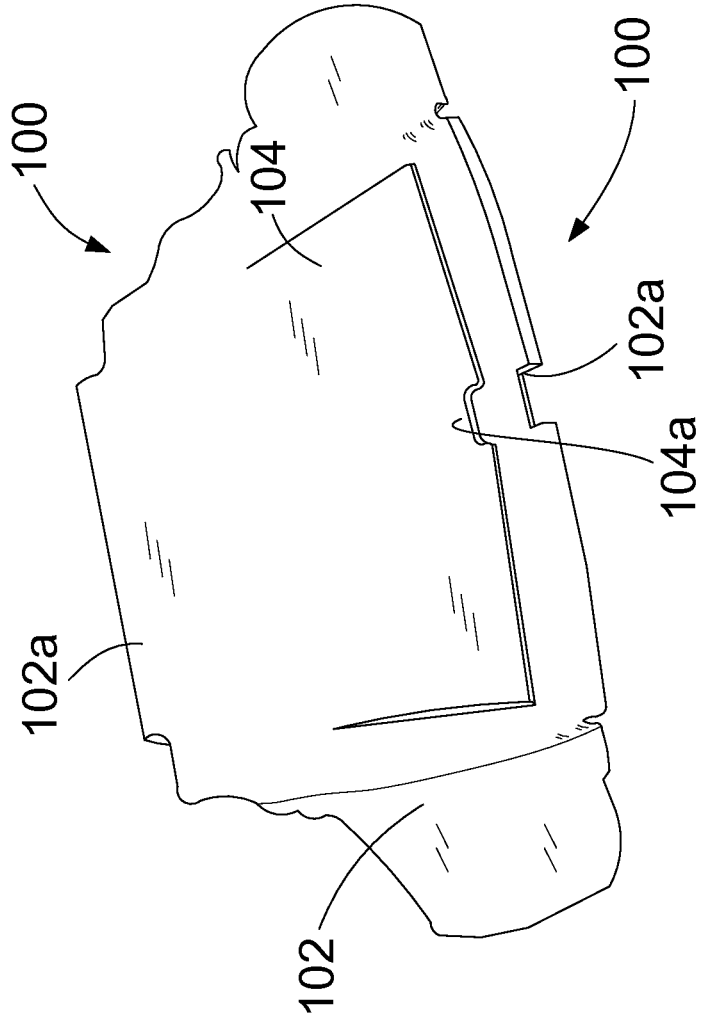
FIG. 7 is a perspective view of the cargo restraining system of FIG. 6 but with the various panels completely collapsed into their stowed positions.

FIG. 7 shows the system 100 is shown in its fully closed (i.e., stowed) position. In this orientation the system 100 essentially forms a generally flat surface upon which other cargo items can be placed. The strength of the floor panel 102, the rear wall panel 104, the side wall panels 106a,106b and the center divider wall 108 cooperatively provide a significant degree of structural strength for supporting articles thereon when the system 100 is in its fully closed position.

Figure 8:
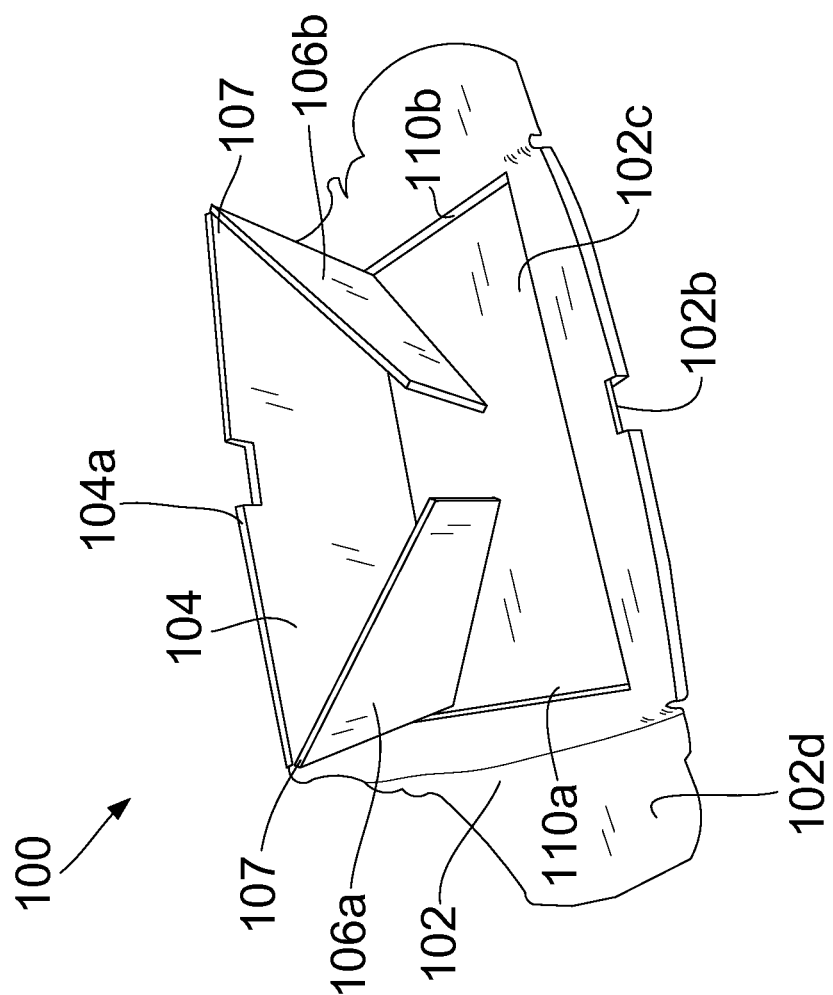
FIG. 8 is a perspective view of the cargo restraining system of FIG. 7 in an intermediate stage of opening.

FIG. 8 shows the system 100 in an intermediate stage of deployment. In this illustration the rear wall panel 104 has been lifted almost into its fully deployed (i.e., fully upright) position. Side wall panels 106a and 106b are in the process of being opened into their fully deployed positions. The rear wall panel 104 may be opened by grasping the cutout 104a and lifting the rear wall panel 104 upwardly away from the floor panel 102. A lower edge 104b of the rear wall panel 104 is pivotally or hingedly secured to the floor panel 102 by any suitable hinge structure. The side wall panels 106a and 106b are also each hingedly attached at their lower edges 107 to the opposing lateral edges of the rear wall panel 104 via suitable hinge structures such as those mentioned above for the rear wall panel 104. As such, the side wall panels 106a and 106b tend to pivot open automatically as the rear wall panel 104 is lifted upwardly. The floor panel 102 in this example has a recessed area 102c within which the rear wall panel 104 and the side wall panels 106a,106b rest when in their stowed positions. This recessed area 102c also provides a pair or lateral wall portions 110a and 110b that serve as stops to limit pivoting movement of the side wall panels 106a and 106b as they are being pivoted outwardly away from each other into their fully deployed positions. Optionally, sections of hook and loop style fastening material could be used on both of the lateral wall portions 110a and 110b and at the abutting surfaces of the side wall panels 106a and 106b to hold the side wall panels in their fully deployed positions.

Figure 9:
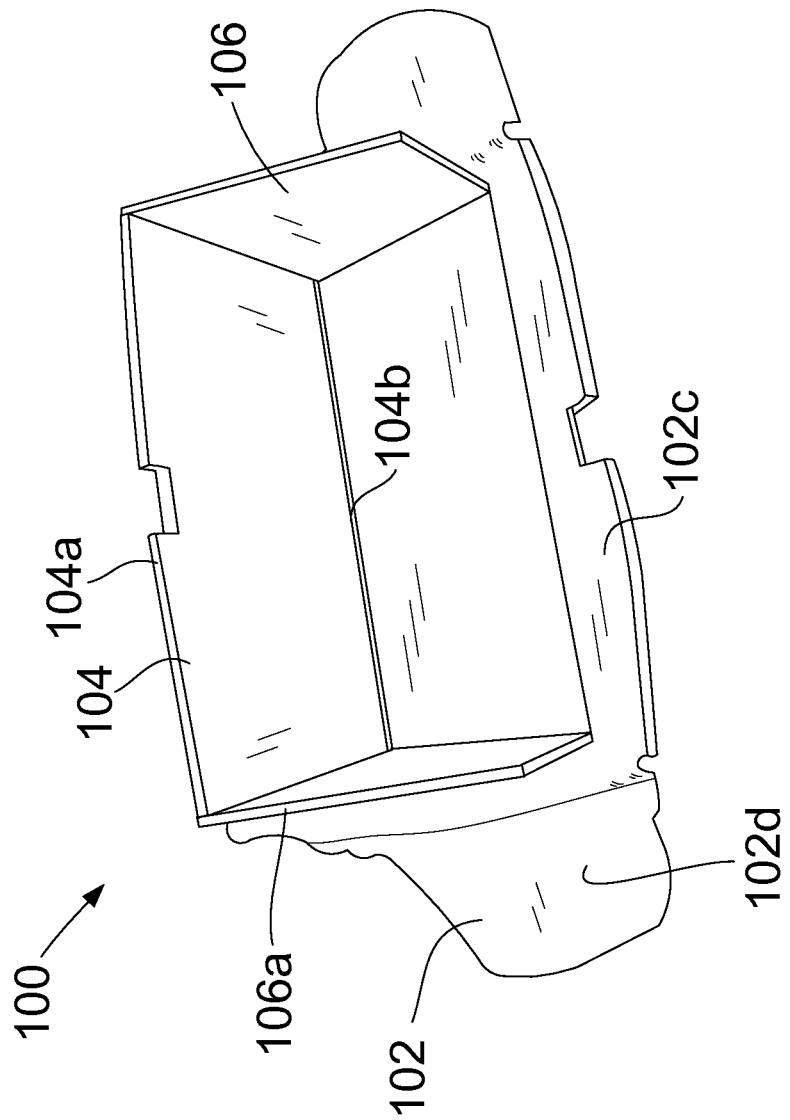
FIG. 9 is perspective view of the cargo restraining system of FIG. 8 in another intermediate stage of opening in which a pair of side panels have been fully opened, but wherein a center divider panel has not yet been raised into its open position.

FIG. 9 shows the side wall panels 106a and 106b in their fully opened positions. In this regard it will be appreciated that the overall dimensions of the side wall panels 106a and 106b should be selected to enable them to be folded down flush in the recessed area 102c of the floor panel 102. The depth of the recessed area 102c is preferably selected such that when both of the side wall panels 106a and 106b and the rear wall panel 104 are folded down into their fully stowed positions, an upper facing surface of the rear wall is generally flush with an upper surface 102d of the floor panel 102.

Referring again to FIG. 6, the center divider panel 108 may be lifted out and pivoted into a fully upright position. A cutout 102e in the floor panel 102 enables one or more fingers to grasp an edge portion of the center divider panel 108 to ease in lifting the panel 108. Preferably, hook and loop style fastening material is incorporated on a lower surface 104c and also along a rear edge 108a of the center divider panel so that the panel 108 can be easily secured in its fully deployed position. Of course, any other suitable means may be employed to hold the center divider panel 108 in its fully upright position. One such means may be a short length of strap with a snap that engages a corresponding snap mounted on the rear wall panel 104. Another means may be a short length of strap with a hook at one end that may be engaged in a suitable opening in the rear wall panel 104. It will be appreciated that any implement may be used provided it does not interfere with allowing the center divider panel 108 and the rear wall panel 104 to be folded down flush against one another when in their stowed positions. A lower edge 108b of the center divider panel 108 also has a suitable hinge, such as described above, to enable pivoting motion of the panel 108 between its operative and stowed positions without separating from the floor panel 102.

Figure 10:
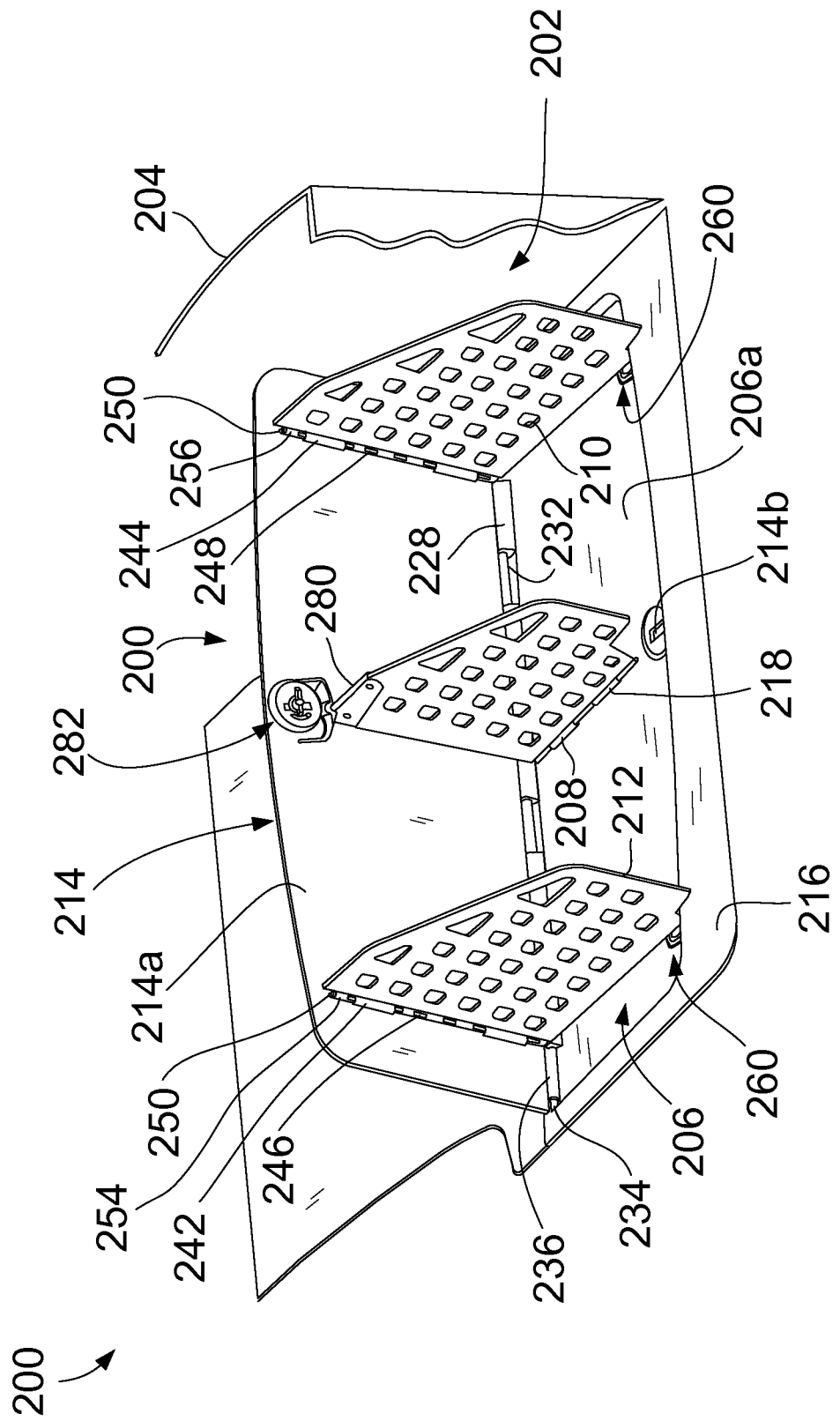
FIG. 10 is a perspective view of a cargo management system in accordance with another embodiment of the present disclosure; the system.

Referring now to FIG. 10, a cargo management system 200 (hereinafter simply "system 200") is shown positioned within the floor of a cargo area 202 of a vehicle 204. The cargo area 202 may form the trunk area of a sedan, the rear most interior area of a station wagon, minivan, full size van or SUV, or even the bed of a pickup truck. Accordingly, the system 200 is not limited to use with only one type of vehicle. It is a significant advantage of the system 200 that it can be integrated into the trunk or cargo areas of a wide variety of vehicles with little modification, or possibly no modification, to the trunk or cargo area of the vehicle itself.

The system 200 includes a floor pan 206, a center divider wall panel 208, outer divider wall panels 210 and 212, and a back wall 214. The floor pan 206 may be secured to a floor area 216 of the cargo area 202 in any convenient fashion, such as by using RivNut® style fasteners, simple threaded fasteners, etc. (not shown). The floor area 216 may also be manufactured by the vehicle manufacturer with a recessed area of a predetermined depth, although this is not mandatory. If the system 200 is secured within a recessed area of the floor area 216, then the system 200, when in its fully stowed position, may appear as virtually an integral portion of the cargo floor area 216. Since the system 200 has a relatively slim profile when in its stowed configuration, even mounting the system 200 on a flat cargo floor area will only consume minimal space within the cargo area when the system 200 is in its stowed configuration.

The system 200 is shown in FIG. 10 in its deployed configuration ready for use. Divider wall panels 208, 210 and 212 cooperate with the back wall 214 to provide areas where groceries, tools, sports equipment or other cargo items can be placed, and the divider wall panels 208, 210 and 212, together with the back wall 214, prevent the items from moving or rolling around within the cargo area 202. The system 200 is expected to be especially useful with helping to maintain grocery bags in an upright orientation while the vehicle is moving.

Figure 11:
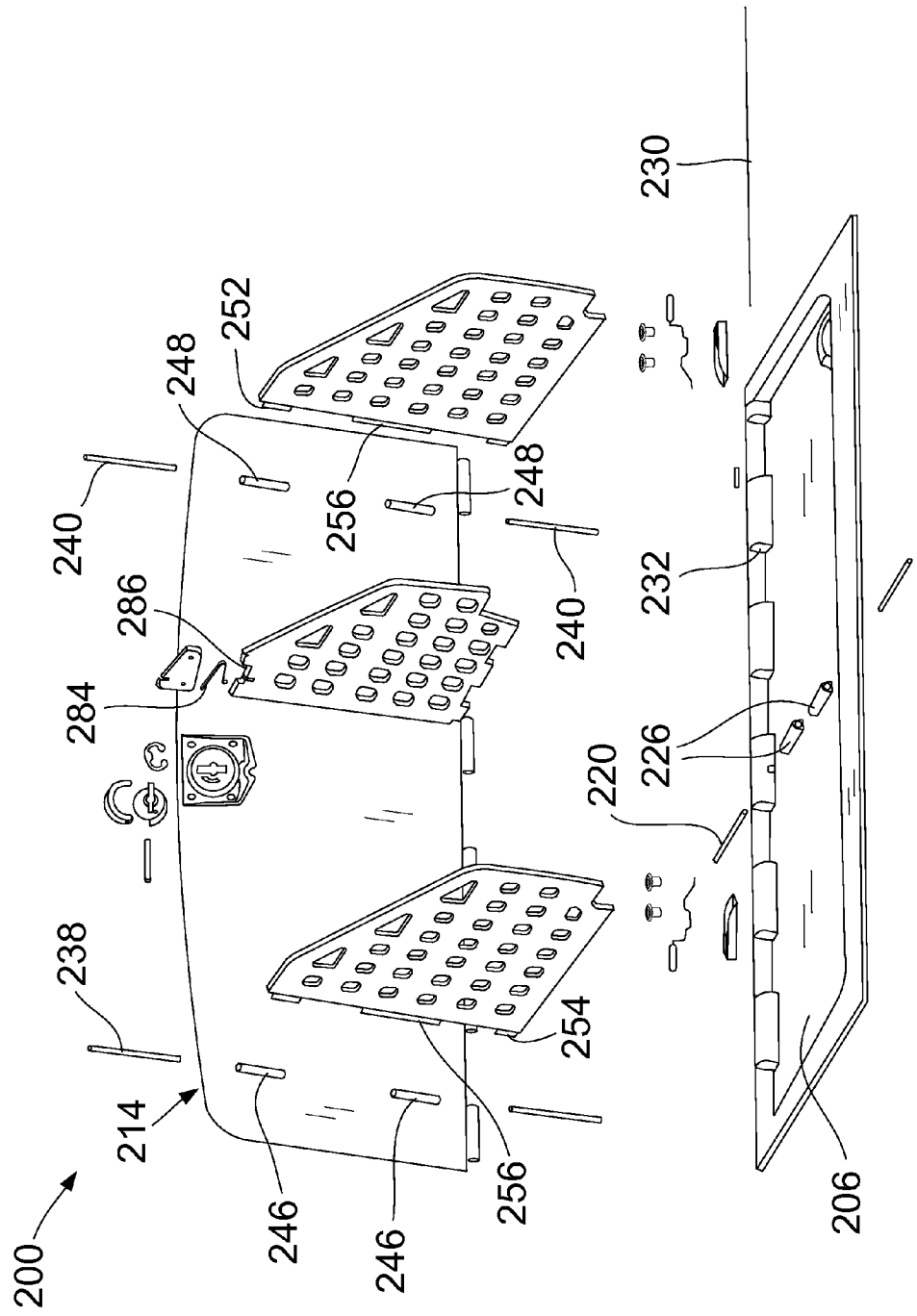
FIG. 11 is a perspective exploded view of various components that may be used to form the cargo management system of FIG. 10.
Figure 12:
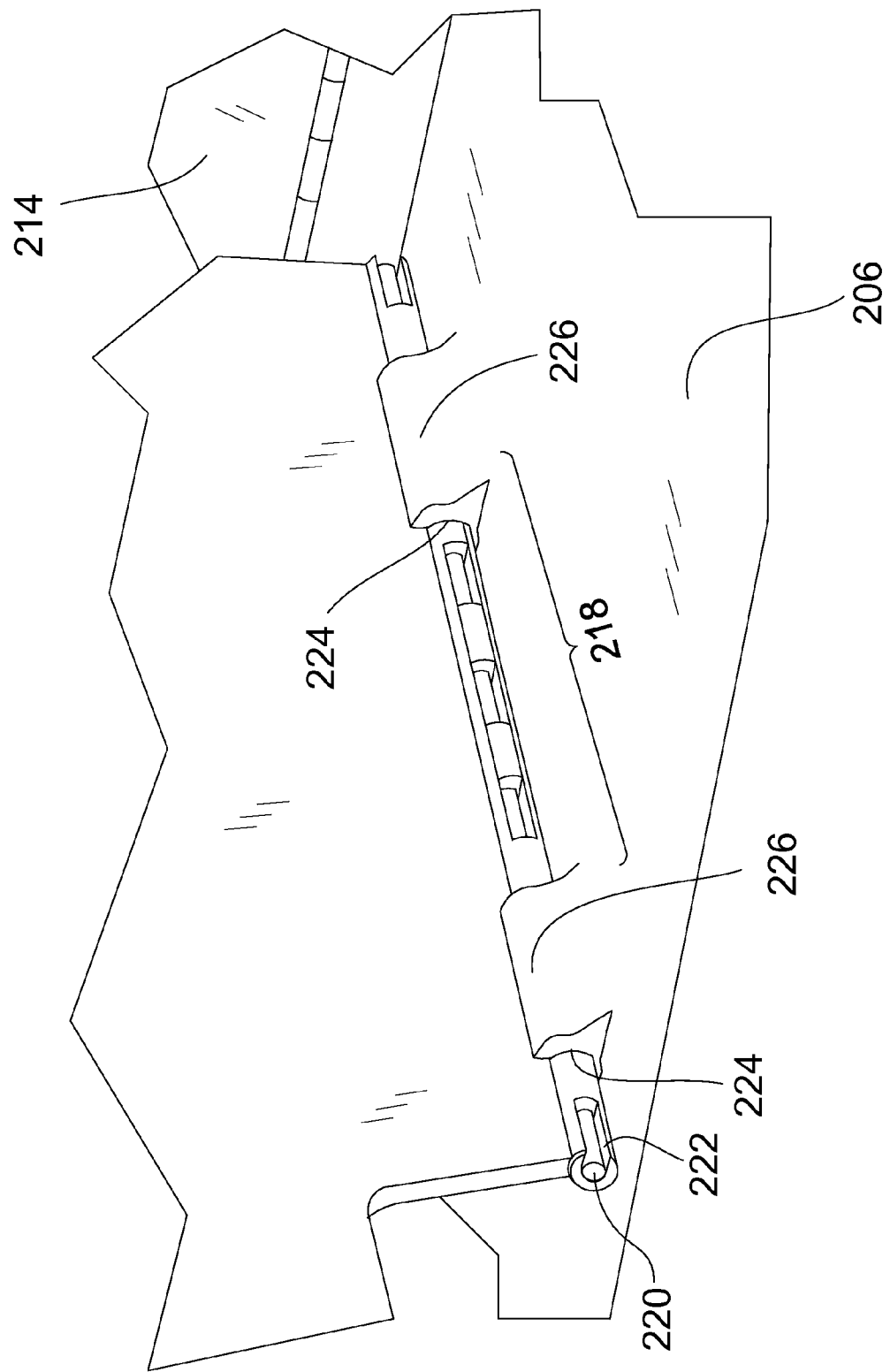
FIG. 12 is an enlarged perspective view of just a portion of the center divider wall panel illustrating how it is pivotally secured to the inside surface of a floor pan of the cargo management system.
Figure 13:
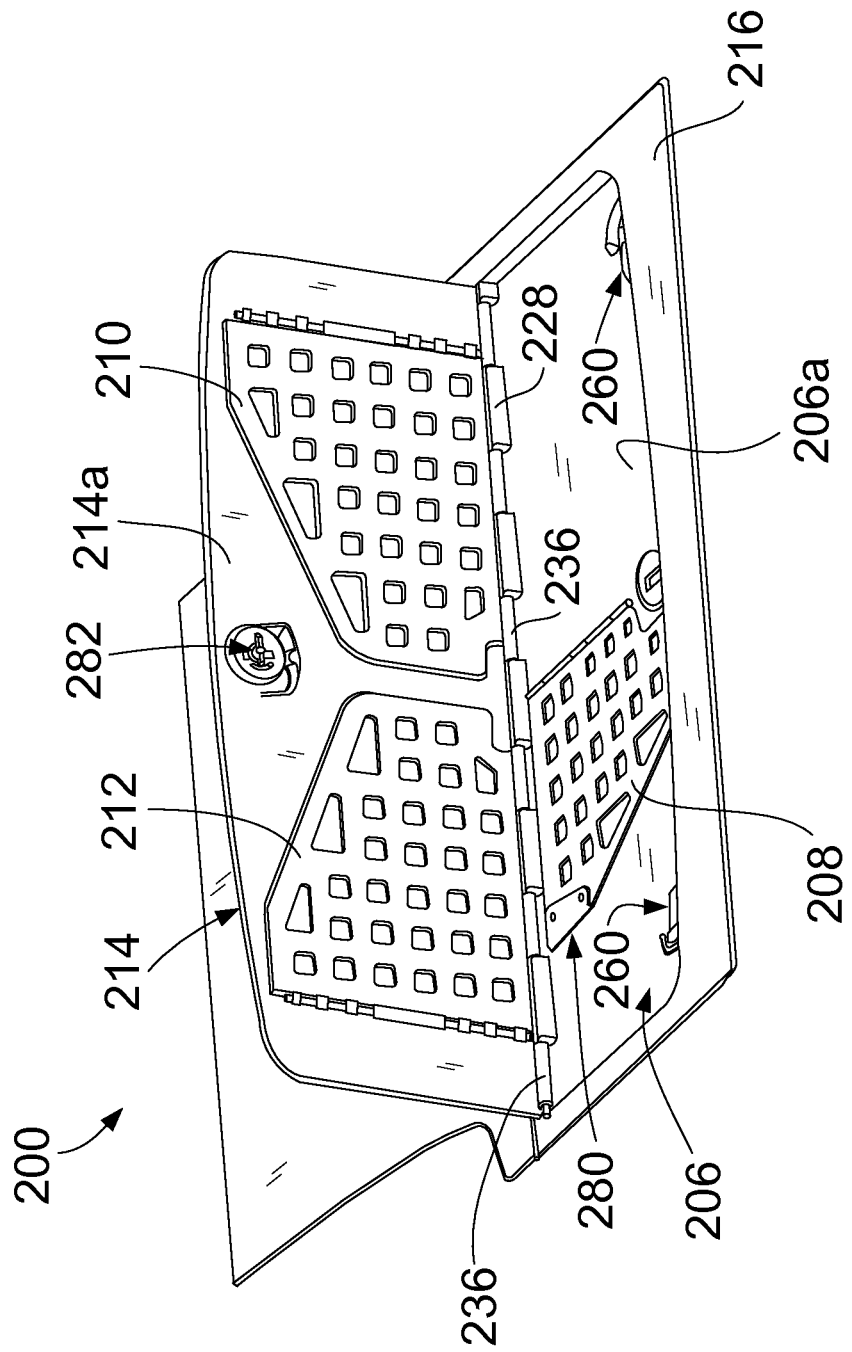
FIG. 13 is a perspective view showing the three divider wall panels of the cargo management system of FIG. 10 collapsed before the back wall is folded down over them.
Figure 14:
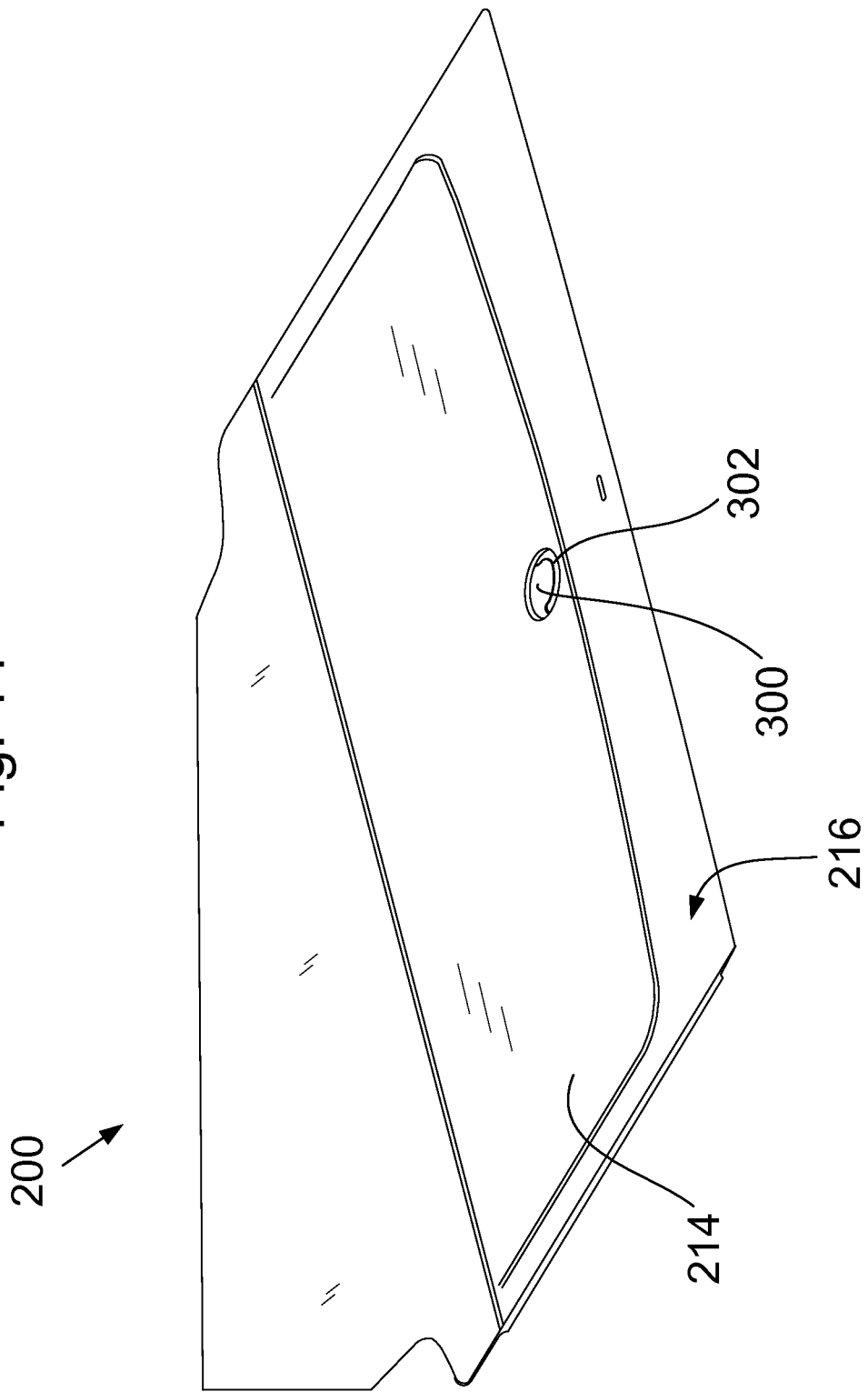
FIG. 14 is a perspective view showing the cargo management system with the back wall folded down over the divider wall panels, and thus with the system in its fully stowed configuration.

With further reference to FIGS. 10-12, the center divider wall panel 208 is pivotally mounted via a hinge arrangement 218 along a lower edge via a pin 220 (FIG. 11) that extends through a bore 222 in the lower edge, and through bores 224 in upstanding mounting structures 226 (FIG. 12) of the floor pan 206. The back wall 214 similarly is secured for pivoting movement relative to the floor pan 206 by mounting structures 228 and an elongated rod 230 (FIG. 11). The elongated rod 230 extends through bores 232 in the mounting structures 228 and through bores 234 in cylindrical flanges 236 at a lower edge of the back wall 214. The outer divider wall panels 210 and 212 are similarly coupled to the back wall 214 for pivoting movement via cylindrical rods 238 and 240 (FIG. 11) which extend through bores 242 and 244 in mounting structures 246 and 248, respectively, on an inner surface 214a of the back wall 214. The rods 238 and 240 also extend through bores 250 and 252 in cylindrical flanges 254 and 256, respectively. The center divider wall panel 208 is able to be pivoted downwardly into a position flush with an upper surface of the floor pan, as shown in FIG. 13. The outer divider wall panels 210 and 212 are able to be collapsed inwardly toward one another, with one of the panels 210 or 212 lying over the center divider wall panel 208 when the system 200 is in its fully closed configuration. This forms an extremely compact, low profile arrangement when the back wall 214 is then collapsed over collapsed wall divider panels 208-212, as shown in FIG. 14.

Figure 15:
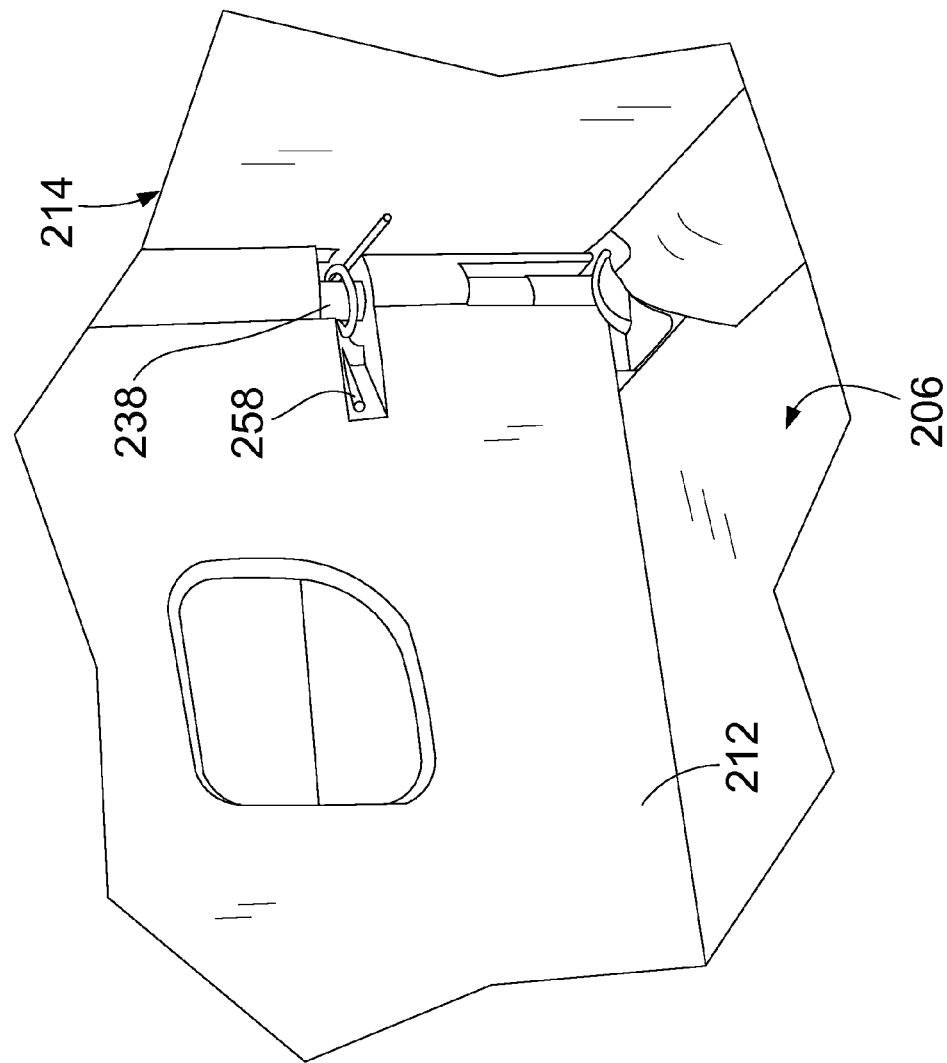
FIG. 15 is an enlarged perspective view of a portion of one of the outer divider wall panels illustrating the use of a torsion spring therewith.

Referring briefly to FIG. 15, each of the outer divider wall panels 210 and 212 may incorporate a torsion spring 258, although only panel 212 is shown in the Figure. It will be understood that the construction and implementation of the torsion spring 258 will be the same for outer divider wall panel 210. The torsion spring in FIG. 15 is wrapped around one of the rods 238, in this example the lower rod 238. This provides a biasing force which tends to assist in opening the outer divider wall panel 212 when the system 200 is being opened for use. Optionally, the back wall 214 may also incorporate a torsion spring to aid in providing a biasing force that tends to help open the back wall 214 from its collapsed orientation.

Figure 16:
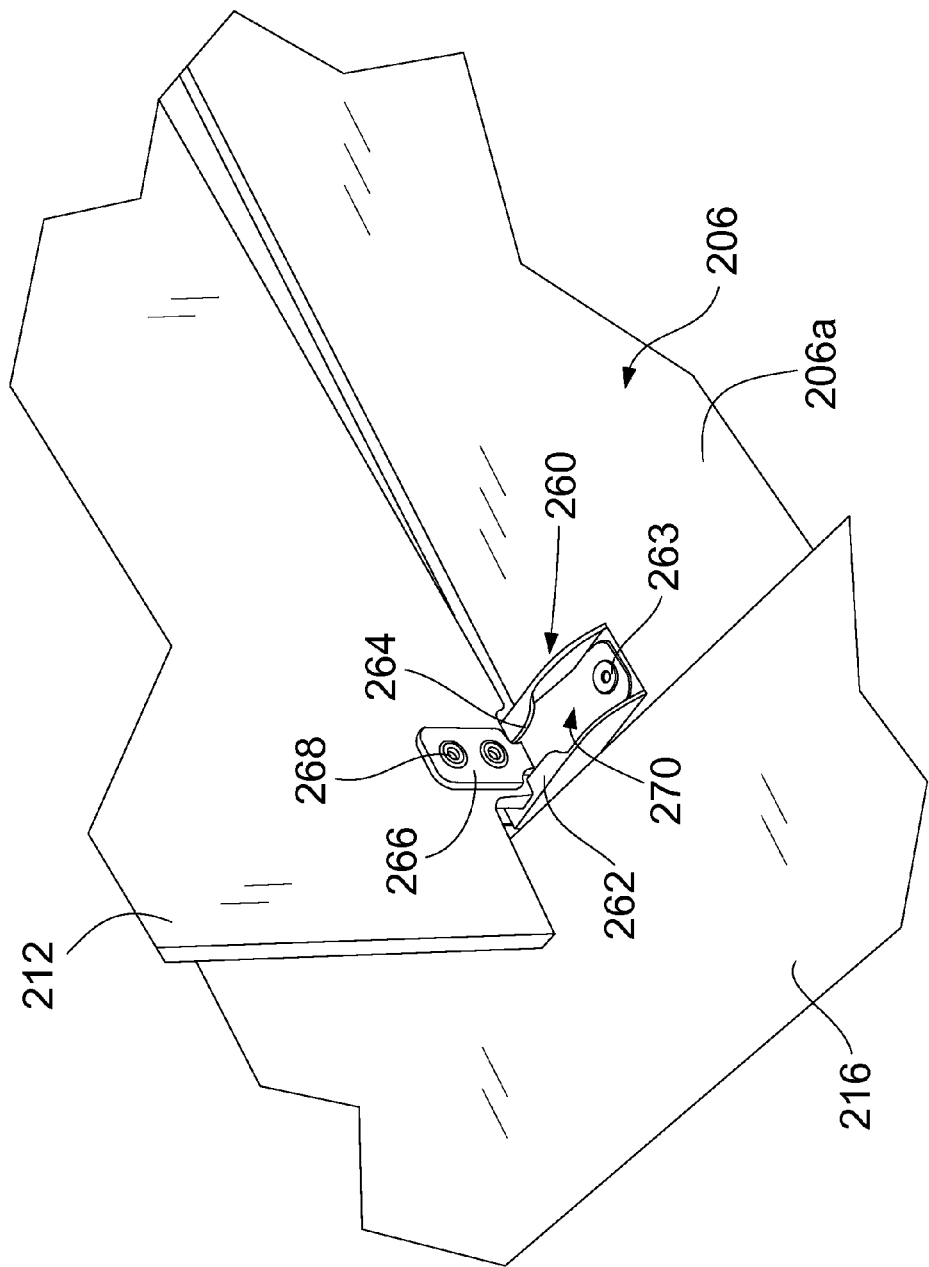
FIG. 16 is a perspective view of a portion of one of the outer divider walls illustrating a latching system that may be used to help secure a respective one of the outer divider wall panels in its opened orientation.
Figure 17:
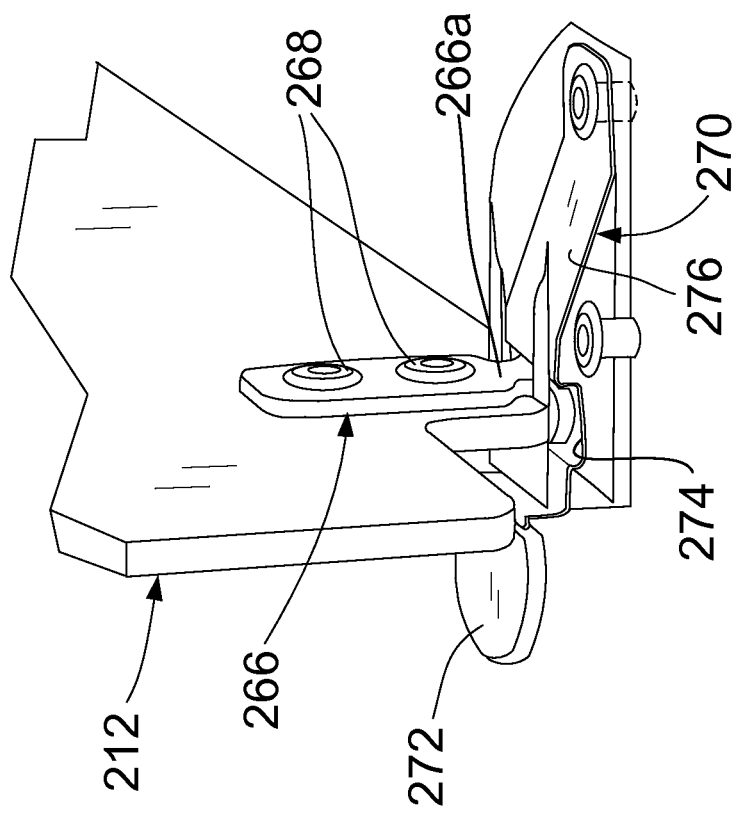
FIG. 17 is an enlarged perspective view of the outer divider wall panel of FIG. 16 along with various components that make up the latching system shown in FIG. 16.

Referring to FIGS. 10, 16 and 17, the outer divider wall panels 210 and 212 each are associated with latching systems 260 which enable the panels 210 and 212 to be secured in their opened (i.e., deployed) orientations. One of the latching systems 260 is shown in greater detail in FIGS. 16 and 17. It will be appreciated that the latching systems 260 are identical to each other in construction, although they need not necessarily be identical. The latching system 260 includes a guide sleeve 262 that is secured, for example by rivets 263, by threaded fasteners or any other suitable means, to an upper surface 206a of the floor pan 206. The guide sleeve has a tapered slot 264 into which a plate 266, secured to a lower edge of outer divider wall panel 212, may be received when the panel 212 is pivoted into its fully open position, as shown in FIG. 16. The plate 266 may be secured to a lower edge of the outer wall panel divider 212 by rivets 268, threaded fasteners or any suitable means. Also attached to the upper surface 206a of the floor pan 206 using the rivet(s) 263 is a flexible latching element 270, which in this example is a spring steel element which acts as both a latching element and a release element. The construction of the latching element 270 is also shown in FIG. 17 and can be seen to include a tab 272 at an outer end thereof which the user may press down with one or more fingers to release the latching element 270. The latching element 270 also has an intermediate channel 274 and a ramped portion 276. As a lower edge 266a of the plate 266 impinges the ramp 276 during opening movement of the outer divider wall panel 212, the lower edge 266a pushes the latching element 270 downwardly, and then the lower edge 266a "snaps" into the channel 274 with a noticeable, tactile feeling to the user as the user is handling the panel 212. At this point the outer divider wall panel 212 will be held securely in its opened (i.e., deployed) orientation. When the user wants to collapse the system 200 into its stowed orientation, the user presses down on the tab 272 slightly using the finger of one hand, while urging the outer divider wall panel 212 into its folded orientation relative to the back wall 214. The plate 266 clears the channel 274 during this motion because of the downward biasing force applied by the user on the flexible latching element 270. The same operation occurs for the latching element 270 associated with the outer divider wall panel 210. As such, the user can quickly and easily deploy or collapse the outer divider wall panels 210 and 212 without any complex procedures and without the need for any tools.

Referring to FIGS. 10, 11, 18 and 18a, the center divider wall panel 208 has an upper edge 208a with its own latching mechanism 280 that cooperates with a locking assembly 282 on the back wall 214. With specific reference to FIG. 18a, the latching mechanism 280 includes a biasing element 284, in this example a V-shaped spring steel element, which is captured in a cutout section 286 of the upper edge 208a of the center divider wall panel 208, and within an interior area of a user depressible member 292. The user depressible member 292 is pivotally secured at a rear end 292a thereof via a rivet 288 or like component, which extends through a hole 291, and a hole 208c in the upper edge 208a. This allows a forward edge 292b of the depressible member 292 to pivot about a relatively small arc while the depressible member 292 is retained to the upper edge 208.

With continuing reference to FIG. 18a, the forward edge 292b of the depressible member 292 is also captured by a rivet 290 or other like component which extends through a hole 292c in the depressible member, and also through a slightly curved slot 208b in the center divider wall panel 208. Thus, the depressible member 292 can move pivotally up and down a distance in accordance with the length of the slot 208b. The depressible member 292 also has a cutout section 292d for engaging a portion of the locking assembly 282. The V-shaped biasing element 284 biases the depressible member 292 upwardly in the drawing of FIG. 18a into engagement with the locking assembly 282, but permits the user to release the center divider wall panel 208 from engagement with the locking assembly 282 simply by pressing downwardly with one or more fingers on the depressible member 292.

Figure 18:
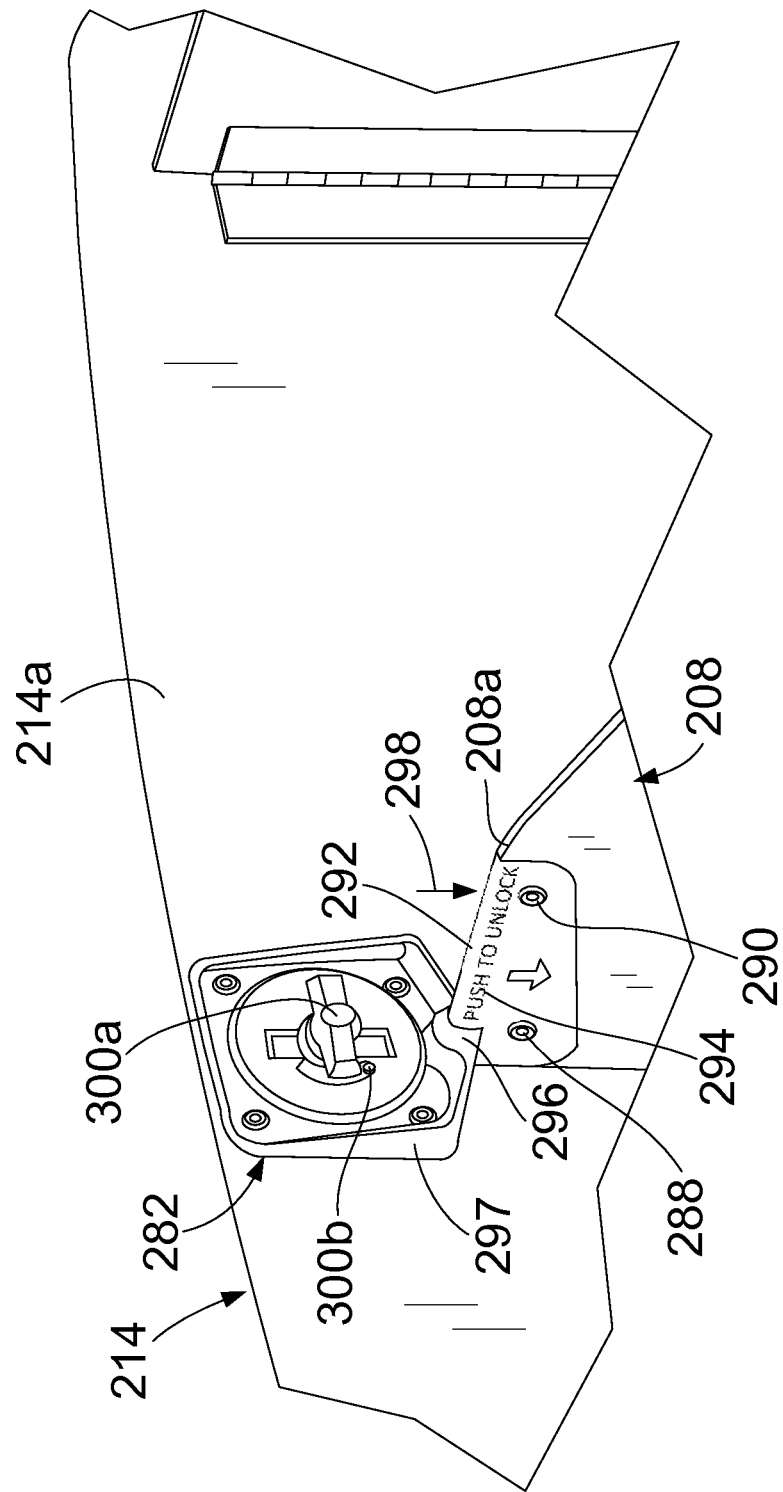
FIG. 18 is an enlarged view of an upper edge of the center divider wall panel engaged with a locking assembly on an inside surface of the back wall of the cargo management system, which holds both the back wall and the center divider wall panel in an upright orientation when the center divider wall panel is in its upright orientation.
Figure 18B:
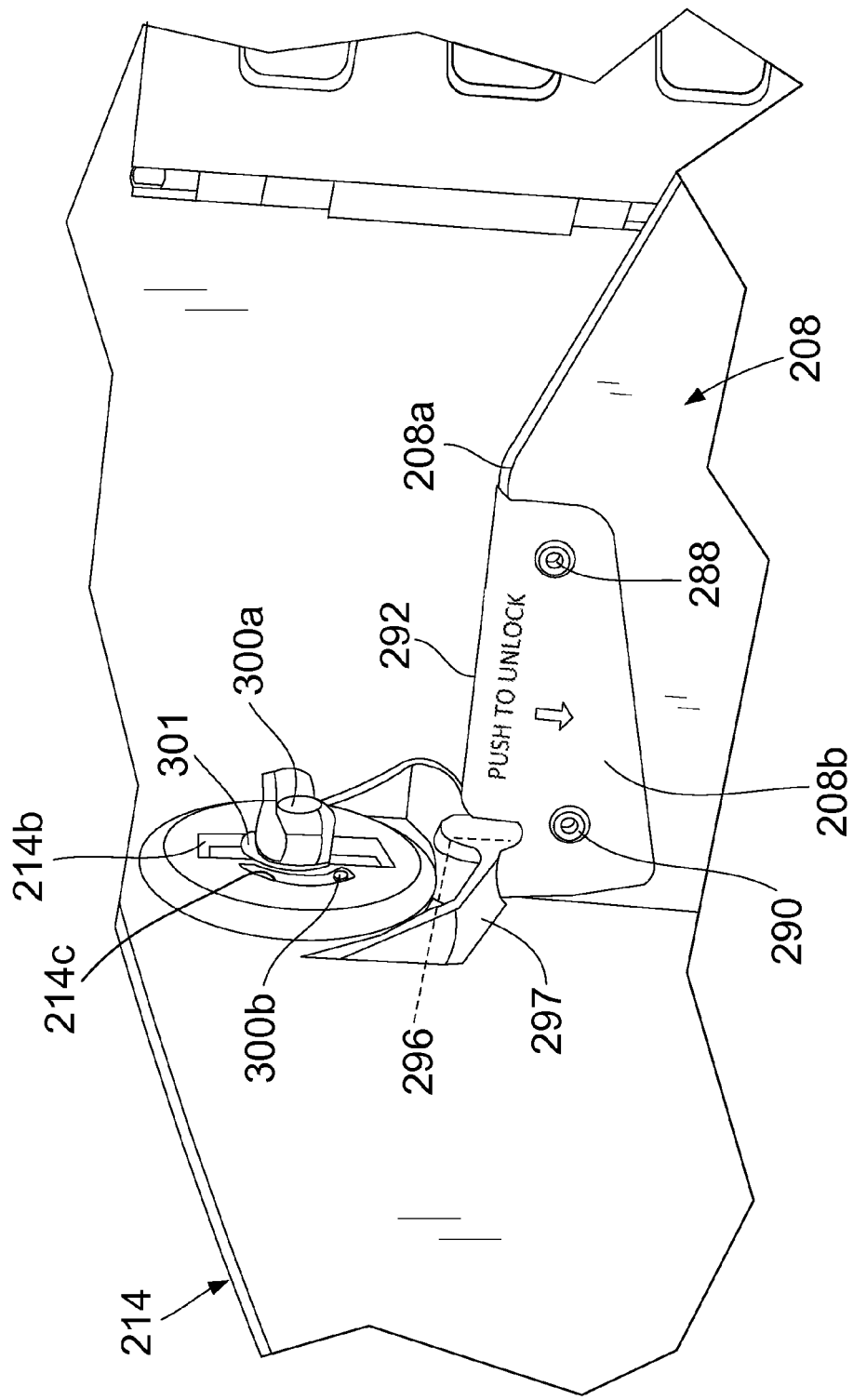
FIG. 18b is an enlarged perspective view of the latching mechanism of the center divider wall panel engaged with the locking mechanism of the back wall.

With brief reference to FIGS. 18 and 18b, the depressible member 292 can be seen engaged with a protruding portion 297 on the inside surface 214a of the back wall 214. The V-shaped biasing element 284 provides a biasing force that tends to urge the rear edge 292b upwardly in the drawing of FIG. 18, and thus into contact with a recess 296 formed in the protruding section 297 of the inside surface 214a of the back wall 214. This enables the center divider wall panel 208 to be maintained engaged with the back wall 214 and in a perpendicular orientation relative to the inner surface 214a of the back wall 214 when the system 10 is being used to hold cargo items. While the depressible member 292 is held in its depressed position, the center divider panel 208 may be urged down into a collapsed position resting parallel to the upper surface 206a of the floor pan 206, when the system 10 is to be placed in its stowed configuration.

With further reference to FIGS. 18a and 18b, the locking assembly 282 also makes use of a rotatable locking base element 300. The rotatable locking base element 300 has (FIG. 18) a T-shaped locking member 300a which is dimensioned to be inserted through a similarly sized cutout 214b in the back wall 214. A tab 300b projecting from the locking base element 300 also engages within an arcuate slot 214c in the back wall 214 and limits the rotational travel of the base element 300 to a predetermined range, the opposite extremes of which define an open position and a locked position. A pin 300c extends through a bore 300d in the base element 300 and through holes 302a in a generally U-shaped knob 302, which secures the U-shaped knob 302 pivotally to the locking base element 300. The U-shaped knob 302 can be rotated by a user by grasping it with two or more fingers and rotating it between two orientations 90 degrees from one another. A spring clip 301 may be used to retain the base element 300 to the back wall 214 while permitting easy rotational movement of the locking base element 300. A recess 306 may also be formed in the base element 300 to aid the user in initially grasping the U-shaped rotatable knob 302 and lifting it out perpendicular to the base element. When the U-shaped knob 302 is in its collapsed orientation as shown in FIG. 19 it forms a generally smooth surface with the base element 300. This enables cargo items to be placed on top of the back wall 214 and easily slid or moved over the back wall 214 without interference from the locking system 282.

Figure 20:
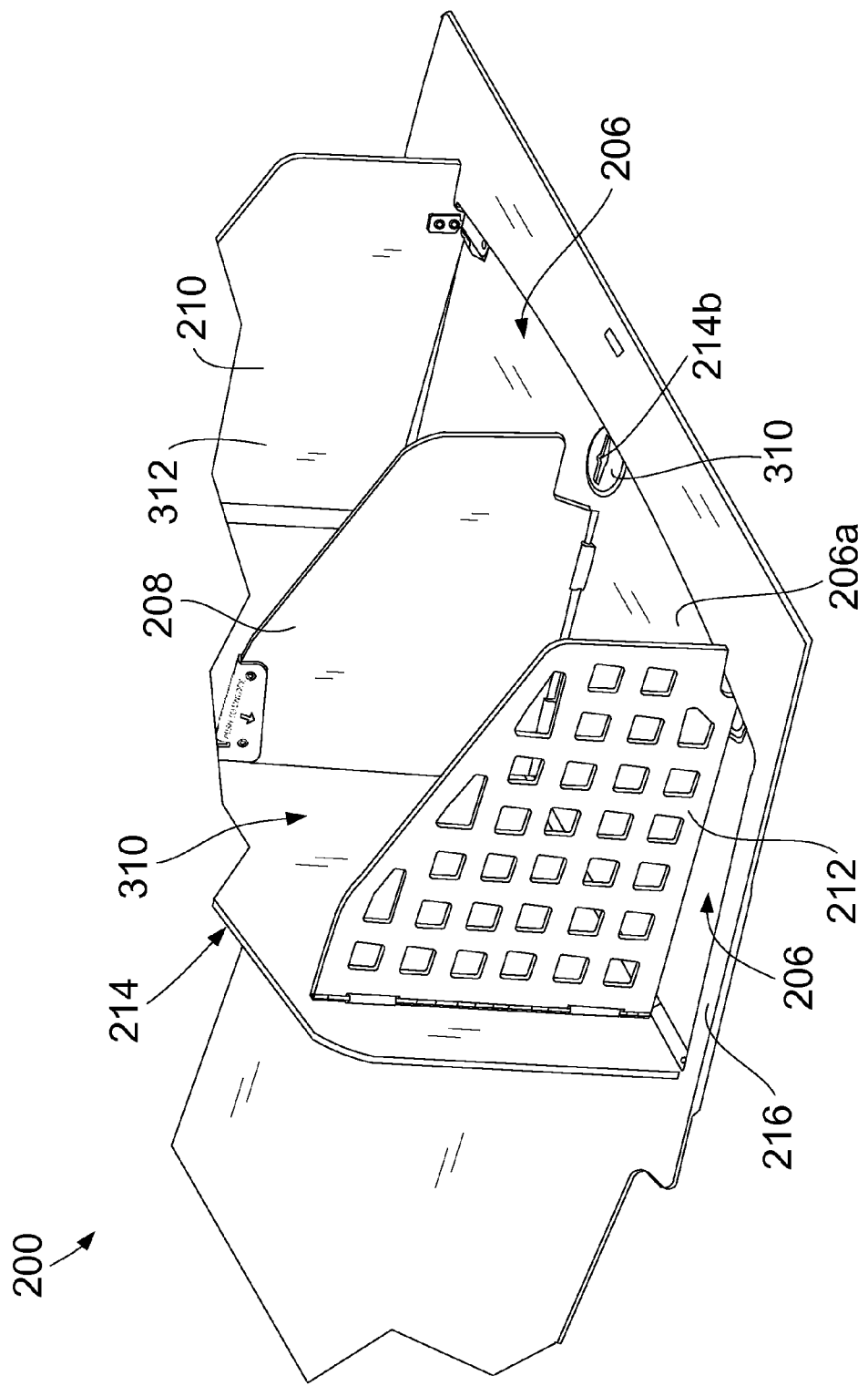
FIG. 20 is a perspective view of a portion of the cargo management system illustrating a slot which is used to help secure the back wall of the cargo management system in its stowed configuration.

FIG. 20 shows a slot 308 formed in a raised section 310 projecting from the surface 206a of the floor pan 206. The slot 308 is shaped and dimensioned to receive the T-shaped locking member 300a when the back wall 214 is lowered down into a position parallel to the surface 206a of the floor pan 206. Once the T-shaped locking member 300a is positioned in the slot 308 and the U-shaped rotatable knob is rotated 90 degrees, the back wall 214 is secured in its stowed position, and encases the collapsed divider wall panels 208-212 between the floor pan 206 and the inside surface 214a of the back wall 214.

With further reference to FIG. 20, when each of the divider wall panels 208, 210 and 212 are positioned in their upright orientations, as shown in FIG. 20, the divider wall panels 208, 210, 212 and 214 form a plurality of separate but adjacent compartments 310 and 312 which can be used to contain various cargo items from rolling around or otherwise moving within the cargo area of a vehicle while the vehicle is travelling. It is anticipated that the system 200 will find particular utility when used with grocery bags and other items which need to be kept in an upright orientation during travel to prevent spilling the contents thereof. Items that tend to roll or slide around easily, such as types of farm produce, tools, sports equipment, etc., can be conveniently confined using the system 200. The system 200, when in its stowed position, takes up virtually no cargo room in the cargo area of a vehicle and allows other cargo items to be placed on top of it without interference from the system 200. Importantly, the system 200 is light in weight and can be manipulated into its fully deployed orientation within a few seconds, and without the need for any special tools or complex procedures, and by a single person.

Referring to FIG. 21, a cargo management system 300 in accordance with another embodiment of the present disclosure is shown. The system 300 is somewhat similar to the system 200 and includes a floor pan 302, a back wall 304 pivotally secured to the floor pan 302, and a pair of outer divider wall panels 306 and 308 pivotally secured to the back wall 304 in a manner identical to that described for the system 200. The system 300, however, incorporates a slidably adjustably positionable center divider wall panel 310. The center divider wall panel 310 is also pivotally secured to a lower base assembly 312. The lower base assembly 312 further includes a user rotatable locking wheel 314. The pivotal attachment enables the center divider wall panel 310 to be folded down against the floor pan 302 when the system 300 is to be collapsed into its stowed configuration.

Referring to FIGS. 21 and 22, the floor pan 302 also includes a rail or track 316. The track 316 receives a foot portion 318 of the lower base assembly 312. The foot portion 318 is slidable within the track 316 and retains the lower base assembly 312 to the track. A tap plate 320 positioned within the track 316 is tightened and loosened relative to the track 316 via a threaded member 322 which is fixedly coupled to the locking wheel 314. Rotation of the locking wheel in one direction tightens the tap plate 320 to clamp the center divider wall panel 310 at a desired longitudinal position along the track 316. An upper edge 310a of the center divider wall panel 310 is releasably retained to an upper base assembly 324. The upper base assembly 324 may also be adjustably, slidably positioned by the user along a track 326. The track 326 is recess mounted in the back wall 304. The upper base assembly 324 includes a base member 328 with a user rotatably locking wheel 330. The construction of upper base assembly 324 is identical to the lower base assembly 312. The upper edge 310a of the center divider wall panel 310 may be releasably secured to the base member 328 of the upper base assembly 324 via a magnet, a clip or any other suitable structure. When the system 300 is to be collapsed into its stowed configuration, the center divider wall panel 310 may be collapsed against the floor pan 302, and the outer divider wall panels 306 and 308 folded inwardly against the back wall 304. The back wall 304 may then be collapsed down against the floor pan 302 where the collapsed system 300 forms a compact, low profile system that can be easily handled and carried by an individual.

A particular advantage of the system 300 is that it may be removably mounted to a pair of tracks 332 positioned fixedly within a floor of a cargo area 334 of a vehicle. A spring biased locking element 336, shown in FIG. 23, may be used to latch the system 300 to the tracks 332. The biasing may be provided by a torsion spring (not shown in the figure). While only one locking element 336 is shown in FIG. 23, it will be appreciated that two or more such locking elements could be incorporated if desired.

When the locking element 336 is moved to its release position, a jaw 338 of the latching element 336 is moved clear of an inwardly protruding lip 340 of the track 332. The entire system 300 may then be lifted up and manipulated out of the tracks 332. In this manner, the entire system 300 may be removed from the vehicle's cargo area in the event it needs to be cleaned, or if maximum space is required within the cargo area for carrying a large item. However, it will be appreciated that when the system 300 is folded into its stowed configuration, the system 300 assumes a low profile that otherwise does not interfere with the placement of other cargo items thereon or within the vehicle's cargo area.

And it will be appreciated while the system 300 shows three wall panels (i.e., panels 306, 308 and 310), that the system 300 could readily be modified so that only two divider wall panels are used, but where at least one of the two divider wall panels is slidably positionable along the tracks 316 and 326 and securable at a user defined longitudinal position, just like the center divider wall panel 310. Still another embodiment is where only the two outer divider wall panels 306 and 308 are used, but where both of the panels 306 and 308 are slidably positionable along the tracks 316 and 326.

The systems 10, 100, 200 and 300 each form a convenient means for implementing a cargo divider/management system that may be collapsed and stowed in a highly space efficient manner when it is not needed. The various panels of each of the systems 10, 100, 200 and 300 may be made from high strength plastics or any other suitably strong, and lightweight materials. Plastics are especially desirable because they are very light in weight and easily cleaned in the event of spillage of liquids, or of dirt or grime being deposited on the various panels.

Advantageously, the systems 10, 100, 200 and 300 can be used to cover a spare tire well, and do not interfere with accessing the spare tire well when such access is needed to remove the vehicle's spare tire. The systems 10, 100, 200 and 300 form relatively flat surfaces that appear as an integral portion of the vehicle's trunk when they are in their fully stowed orientations. As such they do not interfere with storing larger items in the trunk. Another important advantage is that the systems 10, 100, 200 and 300 may be deployed between their stowed and operative configurations without any tools and within a matter of seconds. The various panels of each of the systems 10 and 100 are lightweight and can be easily lifted and manipulated by an individual with only a small degree of effort.

And while the systems 10, 100, 200 and 300 have been described as being easily implemented in a vehicle trunk, it will be appreciated that the teachings presented herein are equally applicable to be used in the floor areas of other types of vehicles, for example in the floor areas of SUVs, minivans, vans, crossovers, and even the beds of pickup trucks. Essentially any floor area of a vehicle where a small degree of space exists for the overall thickness of the system 10, 100, 200 and 300 to be mounted, may enable the system 10, 100, 200 or 300 to be implemented for use.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A cargo management system for use in a cargo area of a motor vehicle, the system comprising:
    a floor pan configured to be fixedly secured to a surface of the cargo area;
    a back wall pivotally secured to the floor pan adjacent an edge of the floor pan, the back wall being of dimensions to cover substantially an entire area of the floor pan when the back wall is placed in a stowed position resting generally parallel to the floor pan;
    a center divider wall panel operatively secured to the floor pan for pivotal movement relative to the floor pan, and adapted to be positioned in an upright orientation perpendicular to the floor pan and perpendicular to the back wall, or in a stowed position resting closely adjacent to or on the floor pan; and
    at least first and second outer divider wall panels each pivotally secured to the back wall and spaced apart from one another, each of the first and second outer divider wall panels being moveable independently of the floor pan between a collapsed orientation, wherein the plurality of outer divider wall panels rest parallel and closely adjacent a surface of the floor pan, and an upright orientation wherein each of the outer divider wall panels, along with the back wall and the center wall, cooperate to form a plurality of compartments at least one compartment for containing cargo items therein.

2. The system of claim 1, wherein the center divider wall panel is adjustably positionable longitudinally along the floor pan.

3. The system of claim 2, further comprising at least one track disposed in at least one of the floor pan or the back wall, and wherein the center divider wall panel is slidable along the at least one track.

4. The system of claim 1, further comprising at least one latching system secured to the floor pan and engageable with an edge portion of an associated one of the first and second outer divider wall panels, for holding the associated one of the first and outer second divider wall panels in an upright orientation generally perpendicular to the back wall.

5. The system of claim 1, further comprising a pair of latching systems, with each one of the pair of latching systems being secured to the floor pan adjacent opposite sides of the floor pan, the latching systems being for securing the first and second outer divider wall panels in upright orientations perpendicular to the back wall.

6. The system of claim 5, wherein each of the latching mechanisms each comprise a flexible latching element with a tab, the flexible latching element having a channel, and wherein a separate plate is secured to an edge of each one of the first and second outer divider wall panels, which engage their respective said flexible latching elements to help secure the first and second outer divider wall panels in upright orientations generally perpendicular to the back wall.

7. The system of claim 1, wherein the back wall includes a locking mechanism, and the floor pan includes structure for engaging with the locking mechanism, to enable the back wall to be secured in a collapsed orientation generally parallel to the floor pan, when the system is configured in a stowed position.

8. The system of claim 7, wherein the first and second outer divider wall panels are captured between the floor pan and the back wall when the back wall is urged into the collapsed orientation.

9. The system of claim 1, wherein at least one of the first and second outer divider wall panels incorporates a torsion spring for providing a biasing force that tends to maintain its associated one of the first and second outer divider wall panels in an open configuration generally perpendicular to the back wall.

10. The system of claim 3, wherein the center divider wall panel includes a latching mechanism for engaging with a portion of the back wall to thus help maintain the center divider wall panel in an upright orientation generally perpendicular to the back wall.

11. The system of claim 7, wherein the locking mechanism incorporates a generally U-shaped rotatable knob for enabling the back wall to be locked to, and unlocked from, the floor pan, with a rotational movement.

12. A cargo management system for use in a cargo area of a motor vehicle, the system comprising:
    a floor pan configured to be fixedly secured to a surface of the cargo area;
    a back wall pivotally secured to the floor pan adjacent an edge of the floor pan;
    first and second outer divider wall panels each pivotally secured to the back wall and spaced apart from one another, each of the first and second divider wall panels being moveable between a collapsed orientation, wherein the plurality of divider wall panels rest parallel and closely adjacent a surface of the floor pan, and an upright orientation;
    a center divider wall panel pivotally secured to the floor pan at a location between the first and second outer divider wall panels; and
    wherein each of the outer divider wall panels, along with the back wall and the center divider wall panel, form a plurality of adjacent compartments for containing cargo items therein.

13. The system of claim 12, further comprising a pair of latching systems, with each one of the pair of latching systems being secured to the floor pan adjacent opposite sides of the floor pan, the latching systems being operable to secure the first and second divider walls in upright orientations perpendicular to the back wall.

14. The system of claim 12, wherein each said latching system includes:

a flexible latching element with a tab, the flexible latching element having a channel, and wherein a separate plate is secured to an edge of each one of the first and second outer divider wall panels, which engage their respective said flexible latching elements to help secure the first and second outer divider wall panels in upright orientations generally perpendicular to the back wall.

15. The system of claim 12, wherein the center divider wall panel includes a latching mechanism for engaging with a portion of the back wall to thus help maintain the center divider wall panel in an upright orientation generally perpendicular to the back wall.

16. The system of claim 12, wherein the back wall is disposed generally parallel to the floor pan when placed in a collapsed orientation, and the outer divider wall panels and the center divider wall panel are all captured between the back wall and the floor pan, when the back wall is urged into the collapsed orientation.

17. The system of claim 12, wherein each one of the outer divider wall panels incorporates a torsion spring for providing a biasing force that tends to maintain its associated said outer divider wall panel in an open configuration generally perpendicular to the back wall.

18. The system of claim 12, wherein the center divider wall panel includes a latching mechanism for engaging with a portion of the back wall to thus help maintain the center divider wall panel in an upright orientation generally perpendicular to the back wall.

19. A cargo management system for use in a cargo area of a motor vehicle, the system comprising:
 a floor pan configured to be fixedly secured to a surface of the cargo area;
 a back wall pivotally secured to the floor pan adjacent an edge of the floor pan;
 first and second outer divider wall panels each pivotally secured to the back wall and spaced apart from one another, each of the first and second divider wall panels being moveable between a collapsed orientation, wherein the plurality of divider wall panels rest parallel and closely adjacent a surface of the floor pan, and an upright orientation;
 biasing components associated with each of the first and second outer divider wall panels for tending to bias the first and second outer divider wall panels into open positions generally perpendicular to the back wall
 a center divider wall panel pivotally secured to the floor pan at a location between the first and second outer divider wall panels; and
 separate first latching systems each associated with a separate one of the outer divider wall panels for securing the outer divider wall panels in upright positions generally perpendicular to back wall;
 a second latching mechanism associated with the center divider wall panel;
 a locking mechanism associated with the back wall that cooperates with the second latching mechanism to hold the center divider wall panel in an upright orientation generally perpendicular to the back wall when the center divider wall panel is deployed for use; and
 wherein each of the outer divider wall panels, the center divider wall panel and the back wall, cooperatively form a plurality of adjacent compartments for containing cargo items therein.

20. The system of claim 19, further comprising a separate torsion spring operably associated with each of the outer divider wall panels for tending to bias the outer divider wall panels into orientations perpendicular to the back wall when the outer divider wall panels are deployed for use.

* * * * *